(12) United States Patent
Tatsumi

(10) Patent No.: US 11,611,678 B2
(45) Date of Patent: Mar. 21, 2023

(54) IMAGE PROCESSING APPARATUS AND NON-TRANSITORY COMPUTER READABLE MEDIUM

(71) Applicant: FUJIFILM Business Innovation Corp., Tokyo (JP)

(72) Inventor: Daisuke Tatsumi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 614 days.

(21) Appl. No.: 16/559,639

(22) Filed: Sep. 4, 2019

(65) Prior Publication Data

US 2020/0304683 A1  Sep. 24, 2020

(30) Foreign Application Priority Data

Mar. 18, 2019  (JP) .............................. JP2019-050219

(51) Int. Cl.
*H04N 1/40* (2006.01)
*G06N 20/00* (2019.01)
*G06N 3/04* (2006.01)
*G06N 3/08* (2006.01)
*G06V 30/413* (2022.01)
*G06N 3/084* (2023.01)

(52) U.S. Cl.
CPC ....... *H04N 1/40093* (2013.01); *G06N 3/0454* (2013.01); *G06N 3/084* (2013.01); *G06N 20/00* (2019.01); *G06V 30/413* (2022.01)

(58) Field of Classification Search
CPC .. H04N 1/40093; G06N 3/0454; G06N 3/084; G06N 20/00; G06N 3/088; G06V 30/287; G06V 10/82; G06V 30/413; G06V 30/1916; G06K 9/6262
USPC ......................................................... 358/537
See application file for complete search history.

(56) References Cited

U.S. PATENT DOCUMENTS

| 8,577,147 | B2 | 11/2013 | Hasegawa et al. |
| 11,269,876 | B1* | 3/2022 | Basavaiah ................. G06F 8/77 |
| 2009/0010620 | A1* | 1/2009 | Hatabu .................... H04N 7/08 |
| | | | 386/E5.002 |

FOREIGN PATENT DOCUMENTS

| JP | 2012053617 | 3/2012 |
| JP | 5385372 | 1/2014 |

* cited by examiner

*Primary Examiner* — Darryl V Dottin
(74) *Attorney, Agent, or Firm* — JCIPRNET

(57) ABSTRACT

An image processing apparatus includes an acquisition unit that acquires an image; and a modifying unit that modifies the image acquired by the acquisition unit by turning an intermittent line different from a line that constitutes a character into a mark by using machine learning in a stage before the image is classified into the character and a mark by a classifying unit.

18 Claims, 21 Drawing Sheets

FIG. 13A

| CHARACTER | WIDTH | HEIGHT |
|---|---|---|
| K | 32 | 44 |
| L | 32 | 48 |
| M | 44 | 52 |
| N | 36 | 48 |
| Q | 36 | 49 |
| P | 32 | 49 |
| Q | 40 | 57 |
| R | 32 | 49 |

FIG. 13B

| CHARACTER | WIDTH | HEIGHT |
|---|---|---|
| ∴ | 461 | 1381 |
| ; | 76 | 908 |
| ◎ | 264 | 929 |
| 1 | 208 | 1041 |
| ≋ | 45 | 1037 |
| I | 200 | 1041 |
| U | 36 | 48 |
| V | 40 | 49 |

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-050219 filed Mar. 18, 2019.

BACKGROUND

(i) Technical Field

The present disclosure relates to an image processing apparatus and a non-transitory computer readable medium.

(ii) Related Art

Japanese Unexamined Patent Application Publication No. 2012-53617 discloses an image processing apparatus that includes a first specifying unit that specifies a pixel having a first tone and a pixel having a second tone from image data representing an image by using plural pixels, a first extracting unit that extracts, as first elements, plural regions that are formed by successive pixels specified as pixels having the first tone by the first specifying unit and satisfy a predetermined condition concerning a size, a second extracting unit that extracts, as a second element, a region that is formed by pixels specified as pixels having the second tone by the first specifying unit and sandwiched by two first elements extracted by the first extracting unit and satisfies a predetermined second condition concerning a size, a registering unit that registers, as candidates of elements that constitutes a line of a specific line type, the first elements extracted by the first extracting unit and the second element extracted by the second extracting unit, a unifying unit that forms a line by unifying the first element and the second element that satisfy a unification condition decided in accordance with candidates that are registered by the registering unit, are continuous in a linear manner, and are included in the unified line or a line type of the line, a calculating unit that calculates features of all or part of the line unified by the unifying unit, and a correcting unit that corrects the unification condition, wherein the correcting unit corrects the unification condition in accordance with the features calculated by the calculating unit or features determined in advance for each line type, and the unifying unit, in a case where there is a candidate that is continuous with the line unified by the unifying unit and satisfies the unification condition corrected by the correcting unit, unifies the line and the candidate.

Japanese Patent No. 5385372 discloses a character recognizing apparatus that includes an extracting unit that extracts dotted line candidates from image data of a ledger sheet, a feature collecting unit that collects, as feature information, thicknesses, lengths, and intervals of dotted lines of the extracted dotted line candidates, an estimating unit that estimates a dotted line candidate part within a character frame to be recognized on the basis of the feature information of a dotted line candidate within the same character frame to be recognized or within another character frame, a removing unit that removes, from the image data, the dotted line candidates extracted by the extracting unit and the dotted line candidate estimated by the estimating unit, and a character recognizing unit that recognizes a character of the image data from which the dotted line candidates have been removed by the removing unit, wherein the estimating unit estimates the dotted line candidate part within the character frame to be recognized and the kind of dotted line on the basis of the feature information of the dotted line candidates within the same character frame to be recognized or within the other character frame and information indicative of an interval between the dotted line candidates.

SUMMARY

Aspects of non-limiting embodiments of the present disclosure relate to providing an image processing apparatus and a non-transitory computer readable medium that can prevent an intermittent line from being classified as a character in a case where an image is classified into a character and a mark, thereby addressing failure to remove the intermittent line.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including an acquisition unit that acquires an image; and a modifying unit that modifies the image acquired by the acquisition unit by turning an intermittent line different from a line that constitutes a character into a mark by using machine learning in a stage before the image is classified into the character and a mark by a classifying unit.

BRIEF DESCRIPTION OF THE DRAWINGS

Exemplary embodiments of the present disclosure will be described in detail based on the following figures, wherein:

FIG. 13A is a conceptual diagram illustrating a list of sizes of characters recognized by a character recognizing unit according to the second exemplary embodiment;

FIG. 13B is a conceptual diagram illustrating a list of sizes of characters recognized by the character recognizing unit according to the second exemplary embodiment;

DETAILED DESCRIPTION

First, meanings of terms used in the description below are described.

A CPU is an abbreviation of a central processing unit. A RAM is an abbreviation of a random access memory. A ROM is an abbreviation of a read only memory. A GPU is a graphic processing unit. An I/F is an abbreviation of an interface. An I/O is an abbreviation of an input output interface. An OCR is an abbreviation of an optical character recognition.

A GAN is an abbreviation of a generative adversarial network. A CNN is an abbreviation of a convolutional neural network. An FCN is an abbreviation of a fully convolutional network.

An SSD is an abbreviation of a solid state drive. A USB is an abbreviation of a universal serial bus. An HDD is an abbreviation of a hard disk drive. An EEPROM is an abbreviation of an electrically erasable and programmable read only memory. A CD is an abbreviation of a compact disc. A DVD is an abbreviation of a digital versatile disc. A CCD is an abbreviation of a charge coupled device. A CMOS is an abbreviation of a complementary metal oxide semiconductor. In the following description, EL is an abbreviation of electro-luminescence.

An ASIC is an abbreviation of an application specific integrated circuit. In the following description, a PLD is an abbreviation of a programmable logic device. In the following description, an FPGA is an abbreviation of a field programmable gate array. An SoC is an abbreviation of a system-on-a-chip. A WAN is an abbreviation of a wide area network.

Comparative Example

A comparative example is described with reference to FIGS. 17 through 19 before description of exemplary embodiments of the technique of the present disclosure.

Figure 17:
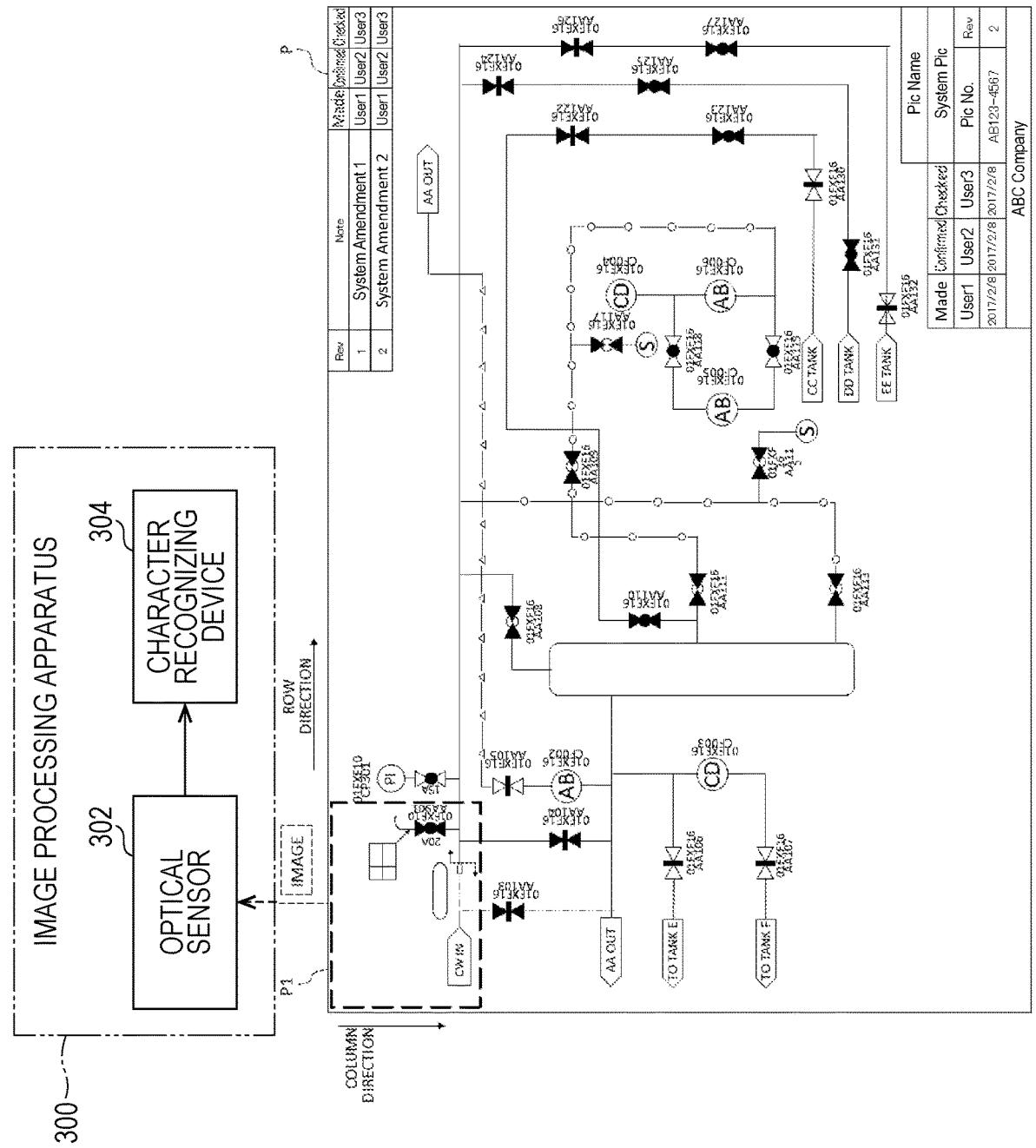
FIG. 17 is a conceptual diagram illustrating an example of a configuration of an image processing apparatus and an aspect of a recording medium to be read according to a comparative example compared with the technique of the present disclosure.

FIG. 17 illustrates an example of a configuration of a conventional image processing apparatus 300. The image processing apparatus 300 is an apparatus that has a character recognizing function of recognizing a character included in an image and includes an optical sensor 302 and a character recognizing device 304.

The optical sensor 302 reads an image from a recording medium P on which an image has been formed. The recording medium P is, for example, a design drawing or a ledger sheet. In a case where an image is read from the recording medium P by the optical sensor 302, a rectangular noted region P1 is set on the recording medium P.

The noted region P1 moves by a predetermined number of pixels (e.g., several pixels to several tens of pixels) from one end to the other end of the recording medium P in a row direction of the recording medium P. When the noted region P1 reaches the other end in the row direction, the noted region P1 shifts by one stage in a column direction and then moves from one end to the other end of the recording medium P. The "one stage" as used herein refers to, for example, a length corresponding to a length of the noted region P1 in the column direction. In the example illustrated in FIG. 17, a position of start of movement of the noted region P1 is an upper left corner of the front view in FIG. 17, and a position of end of movement of the noted region P1 is a lower right corner of the front view in FIG. 17. The optical sensor 302 reads, for each stage in the column direction, an image within the noted region P1 every time the position of the noted region P1 changes by the predetermined number of pixels in the row direction.

The character recognizing device 304 acquires an image read by the optical sensor 302. The image acquired by the character recognizing device 304 is, for example, a raster image. The character recognizing device 304 executes character recognizing processing on the image acquired from the optical sensor 302. The character recognizing processing includes, for example, OCR processing. Hereinafter, the image acquired from the optical sensor 302 by the character recognizing device 304 is also referred to as an "image to be processed".

Figure 18:
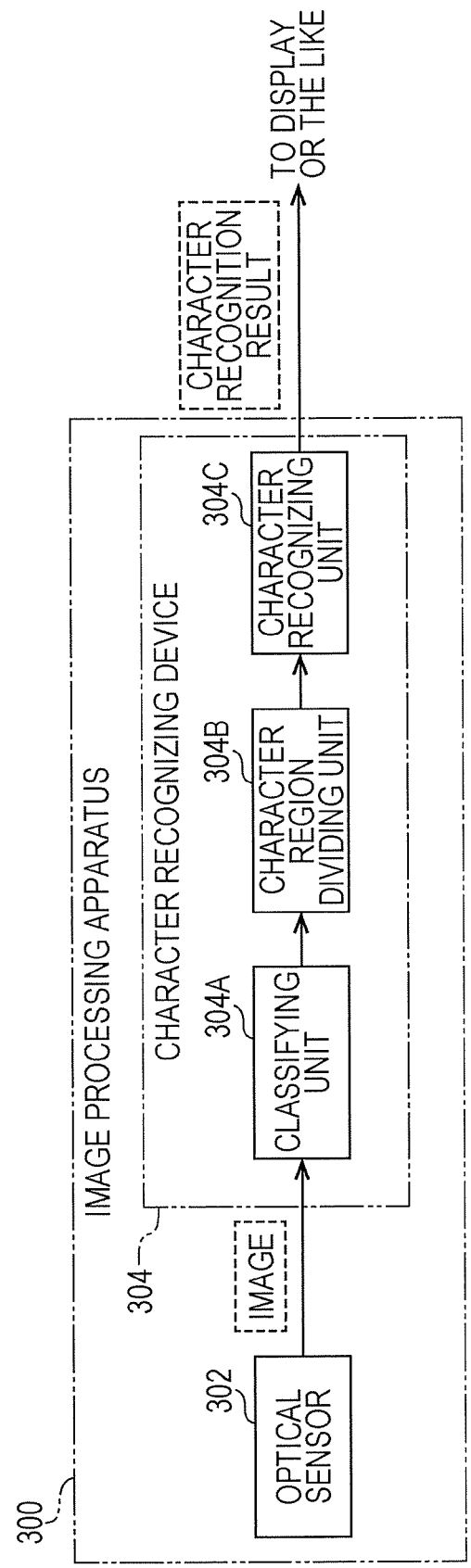
FIG. 18 is a block diagram illustrating an example of functions of the image processing apparatus illustrated in FIG. 17.
Figure 19:
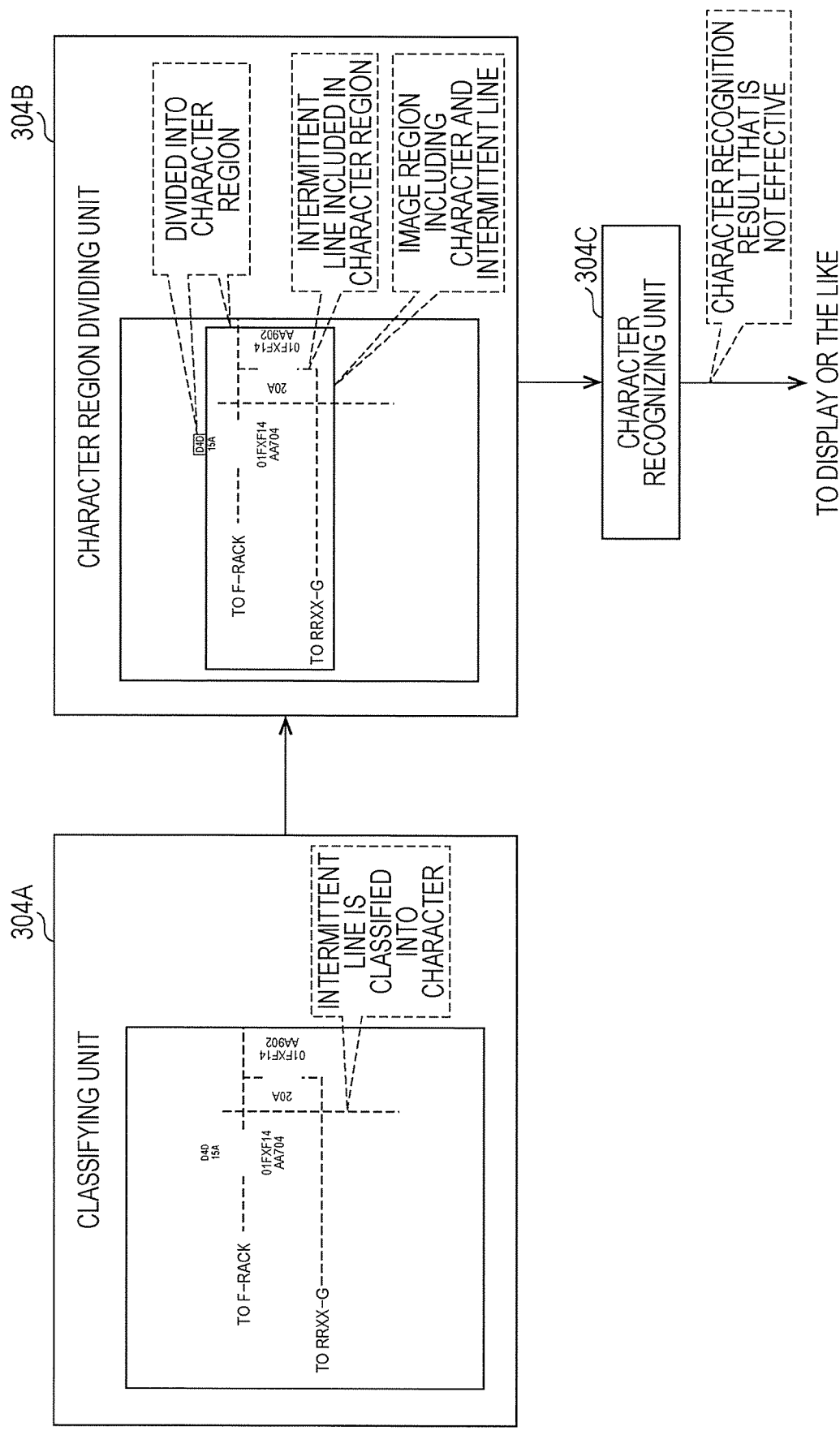
FIG. 19 is a conceptual diagram illustrating an example of contents of processing of a classifying unit, a character region dividing unit, and a character recognizing unit illustrated in FIG. 18.

For example, as illustrated in FIG. 18, the character recognizing device 304 includes a classifying unit 304A, a character region dividing unit 304B, and a character recognizing unit 304C. The classifying unit 304A classifies the image to be processed into a character and a mark. The "mark" as used herein refers to a mark that is visually perceivable. The mark that is visually perceivable refers to a figure, a sign, a color, or a combination thereof. Examples of the figure, sign, color, or combination thereof include a ruled line, a table, and a picture. The "character" as used herein refers to a numeral, an alphabet, a hiragana, a katakana, a kanji, or a character of other languages.

The character region dividing unit 304B divides the image to be processed from which the mark classified by the classifying unit 304A has been removed into a character region. The character region refers to a rectangular image region including a character classified by the classifying unit 304A.

The character recognizing unit 304C performs character recognizing processing on the character region obtained by dividing the image to be processed by the character region dividing unit 304B. The character recognizing unit 304C supplies a character recognizing result that is obtained by performing the character recognizing processing on the character region to a display or the like (not illustrated).

A intermittent line included in the image to be processed is sometimes classified not as a mark but as a character by the classifying unit 304A. The intermittent line is a line different from a line that constitutes a character. The intermittent line refers to a line other than a solid line, such as a dotted line, a broken line, a line with alternate long and short dashes, or a line with alternate long and two short dashes. These intermittent lines often have image characteristics (e.g., a size and a shape) close to a line that constitutes a character and is therefore sometimes classified as a character. In a case where an intermittent line is classified as a character by the classifying unit 304A, an image region including a character and the intermittent line is divided as a character region by the character region dividing unit 304B, for example, as illustrated in FIG. 19.

In a case where the image region including the character and the intermittent line is divided as a character region, the character recognizing unit 304C performs character recognizing processing on the image region including the character and the intermittent line, and a character recognition result that is not effective is supplied to the display or the like. The "character recognition result that is not effective" as used herein refers, for example, to a character string that is utterly irrelevant with the character included in the image region on which the character recognizing processing has been performed.

First Exemplary Embodiment

An exemplary embodiment of an image processing apparatus and a non-transitory computer readable medium according to the technique of the present disclosure is described in accordance with the accompanying drawings.

Figure 1:
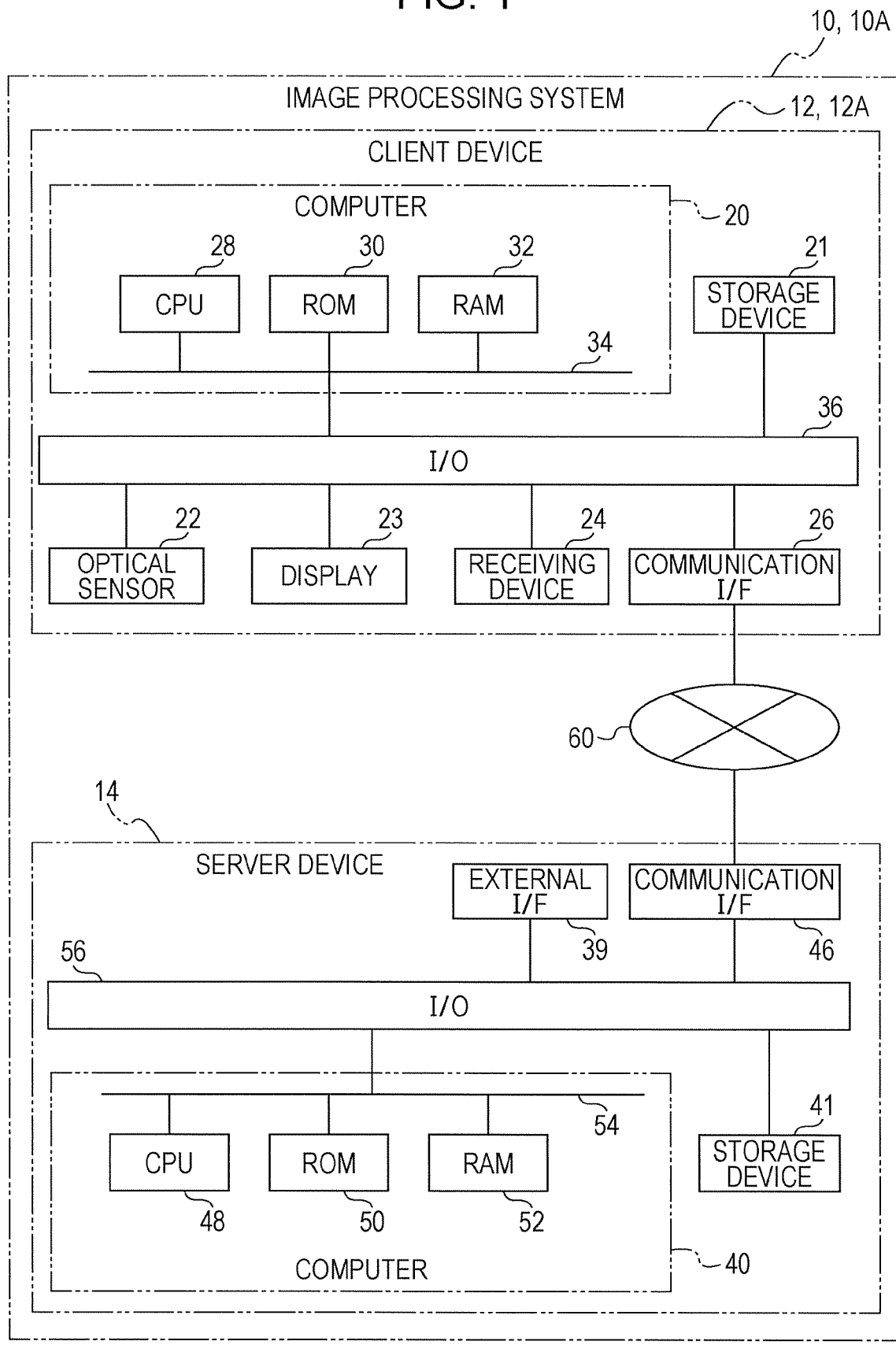
FIG. 1 is a block diagram illustrating an example of a configuration of an image processing system according to first and second exemplary embodiments.

For example, as illustrated in FIG. 1, an image processing system 10 includes a client device 12, a server device 14, and a communication network 60. The image processing system 10 is an example of an image processing apparatus according to the technique of the present disclosure.

The client device 12 includes a computer 20, a storage device 21, an optical sensor 22, a display 23, a receiving device 24, a communication I/F 26, and an I/O 36.

The computer 20 includes a CPU 28, a ROM 30, and a RAM 32. The CPU 28, the ROM 30, and the RAM 32 are connected to one another through a bus line 34.

Various kinds of programs are stored in the ROM 30. The CPU 28 reads the various kinds of programs from the ROM 30 and loads the various kinds of programs thus read out into the RAM 32. The CPU 28 controls the whole client device 12 in accordance with the various kinds of programs loaded into the RAM 32.

The I/O 36 includes an input output port (not illustrated), and the storage device 21, the optical sensor 22, the display 23, the receiving device 24, and the communication I/F 26 are connected to the I/O 36 through the input output port. The I/O 36 is connected to the bus line 34, and the CPU 28 exchanges various kinds of information with the storage device 21, the optical sensor 22, the display 23, the receiving device 24, and the communication I/F 26 through the I/O 36.

The storage device 21 is a non-volatile memory such as an SSD, an HDD, or an EEPROM. The CPU 28 reads and writes various kinds of information from and to the storage device 21.

The optical sensor 22 is a one-dimensional line sensor having a CCD image sensor and optically reads an image from a recording medium such as a design drawing or a ledger sheet under control of the CPU 28. Although a CCD image sensor is illustrated as an example, the technique of the present disclosure is not limited to this, and an image sensor of other kinds such as a CMOS image sensor may be applied. Furthermore, although a one-dimensional line sensor is illustrated as an example, the technique of the present disclosure is not limited to this, and a two-dimensional sensor may be applied.

The display 23 displays an image, character information, and the like under control of the CPU 28. The display 32 is, for example, a liquid crystal display. The display 23 may be another kind of display such as an organic EL display instead of a liquid crystal display.

The receiving device 24 includes a touch panel, a hardware keyboard, a mouse, and the like and receives various kinds of instructions from a user. The CPU 28 operates in accordance with the various kinds of instructions received by the receiving device 24.

The communication I/F 26 is a communication device having an FPGA and is connected to the communication network 60. The communication I/F 26 is for communication between various kinds of communication devices connected to the communication network 60 and the CPU 28. The communication network 60 is, for example, the Internet or a WAN such as a public communication network.

The server device 14 includes an external I/F 39, a computer 40, a storage device 41, a communication I/F 46, and an I/O 56.

The computer 40 includes a CPU 48, a ROM 50, and a RAM 52. The CPU 48, the ROM 50, and the RAM 52 are connected to one another through a bus line 54.

Various kinds of programs are stored in the ROM 50. The CPU 48 reads out the various kinds of programs from the ROM 50 and loads the various kinds of programs thus read out into the RAM 52. The CPU 48 controls the whole server device 14 in accordance with the various kinds of programs loaded into the RAM 52.

The I/O 56 includes an input output port (not illustrated), and the external I/F 39, the storage device 41, and the communication I/F 46 are connected to the I/O 56 through the input output port. The I/O 56 is connected to the bus line 54, and the CPU 48 exchanges various kinds of information with the external I/F 39, the storage device 41, and the communication I/F 46 through the I/O 56.

The external I/F 39 is a communication device having an FPGA. An external device (not illustrated) such as a personal computer, a USB memory, an external SSD, an external HDD, or a memory card is connected to the external I/F 39. The external I/F 39 is for exchanging various kinds of information between the CPU 46 and the external device.

The storage device 41 is a non-volatile memory such as an SSD, an HDD, or an EEPROM. The CPU 48 reads and writes various kinds of information from and to the storage device 41.

The communication I/F 46 is a communication device having an FPGA and is connected to the communication network 60. The communication I/F 46 is for communication between the various kinds of communication devices connected to the communication network 60 and the CPU 48. For example, the communication I/F 46 is for communication between the CPU 28 of the client device 12 and the CPU 48 of the server device 14. The server device 14 receives a request from the client device 12 through the communication I/F 46 and provides a service according to the request from the client device 12 to the client device 12 through the communication I/F 46.

Figure 2:
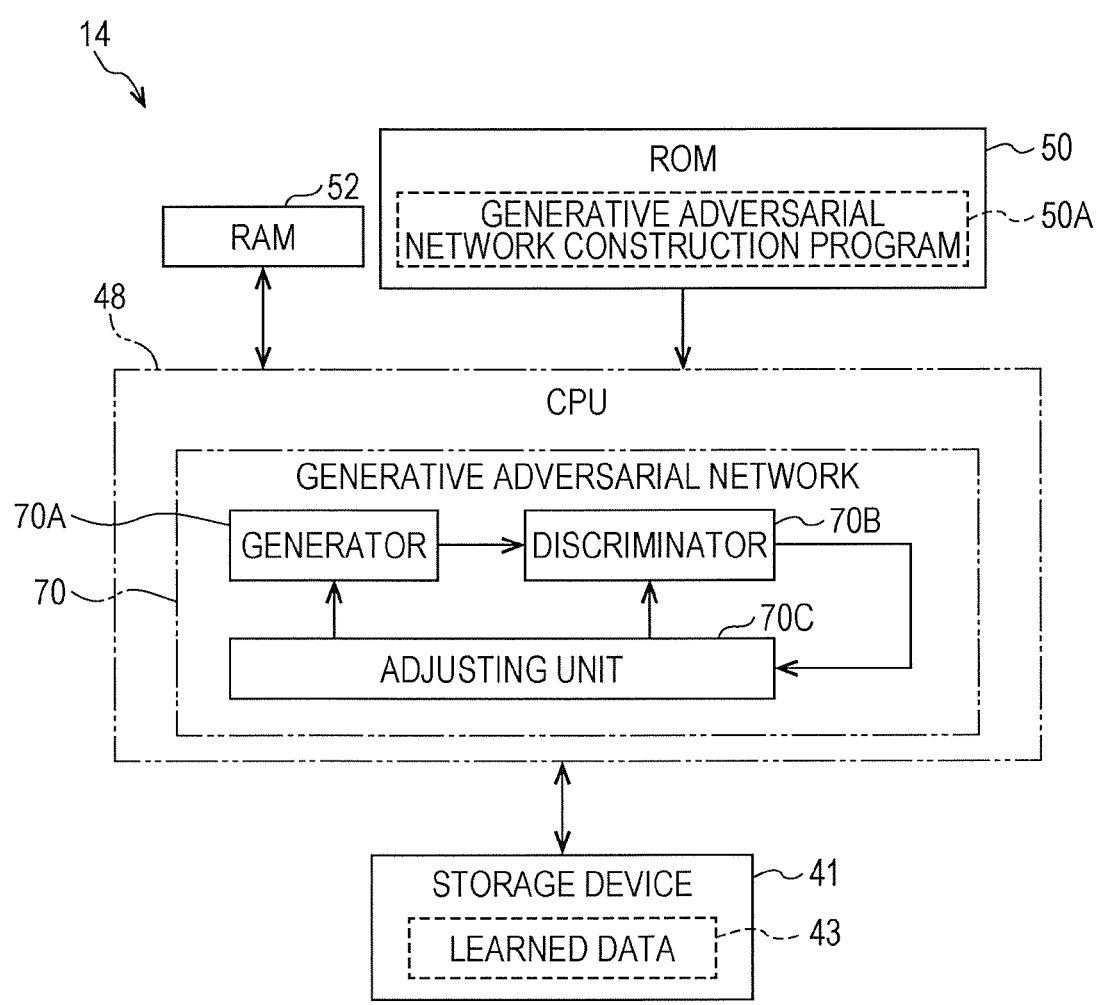
FIG. 2 is a block diagram illustrating an example of a configuration of a server device according to the first exemplary embodiment.

For example, as illustrated in FIG. 2, a generative adversarial network construction program 50A is stored in the ROM 50 of the server device 14. The CPU 48 reads out the generative adversarial network construction program 50A from the ROM 50 and loads the generative adversarial network construction program 50A thus read out into the RAM 52. The CPU 48 constructs a generative adversarial network 70 that is one kind of artificial intelligence algorithm generally called a "GAN" by executing the generative adversarial network construction program 50A loaded into the RAM 52.

The generative adversarial network 70 is one kind of image generation network (generation model). The generative adversarial network 70 generates a new image by performing processing on a given image in accordance with learned data 43. Although the generative adversarial network 70 is illustrated as an example, another example of the image generation network is a variational auto encoder or the like.

The generative adversarial network 70 includes a generator 70A, a discriminator 70B, and an adjusting unit 70C. The generative adversarial network 70 has a correct image, and the generator 70A generates a new image on the basis of the given original image so that the new image becomes similar to the correct image. A correct image and an image to be discriminated are given to the discriminator 70B. The image to be discriminated is an image generated by the generator 70A. The discriminator 70B discriminates truth and falsehood of the image to be discriminated. That is, the discriminator 70B discriminates whether or not the image to be discriminated is the correct image. The discriminator 70B learns to more accurately discriminate truth and falsehood of the image to be discriminated. Meanwhile, the generator 70A leans to create a false image to be discriminated that makes the discriminator 70B falsely recognize the image to be discriminated as a correct image.

The generator 70A and the discriminator 70B are each realized by a neural network that is one kind of machine learning. The neural network applied to the generator 70A and the discriminator 70B is, for example, a multilayer perceptron. In the generative adversarial network 70, learning advances through alternate competition between the generator 70A and the discriminator 70B. The competitive relationship between the generator 70A and the discriminator 70B is expressed by sharing of a loss function. That is, the generator 70A and the discriminator 70B are caused to compete so that in a case where a loss function of one of the generator 70A and the discriminator 70B becomes small, a loss function of the other one of the generator 70A and the discriminator 70B becomes large. Specifically, the generator 70A learns in order to reduce a value of the loss function, and the discriminator 70B learns in order to increase a value of the loss function.

In order to facilitate learning of the generator 70A and the discriminator 70B, the adjusting unit 70C adjusts weight coefficients of the generator 70A and the discriminator 70B by back propagation in accordance with a discrimination result of the discriminator 70B. Learning of the generator 70A and the discriminator 70B advances as a result of the adjustment of the weight coefficients, and learned data 43 obtained by advance of the learning is stored in the storage device 41. The learned data 43 is updated as the learning of the generator 70A and the discriminator 70B advances.

Figure 3:
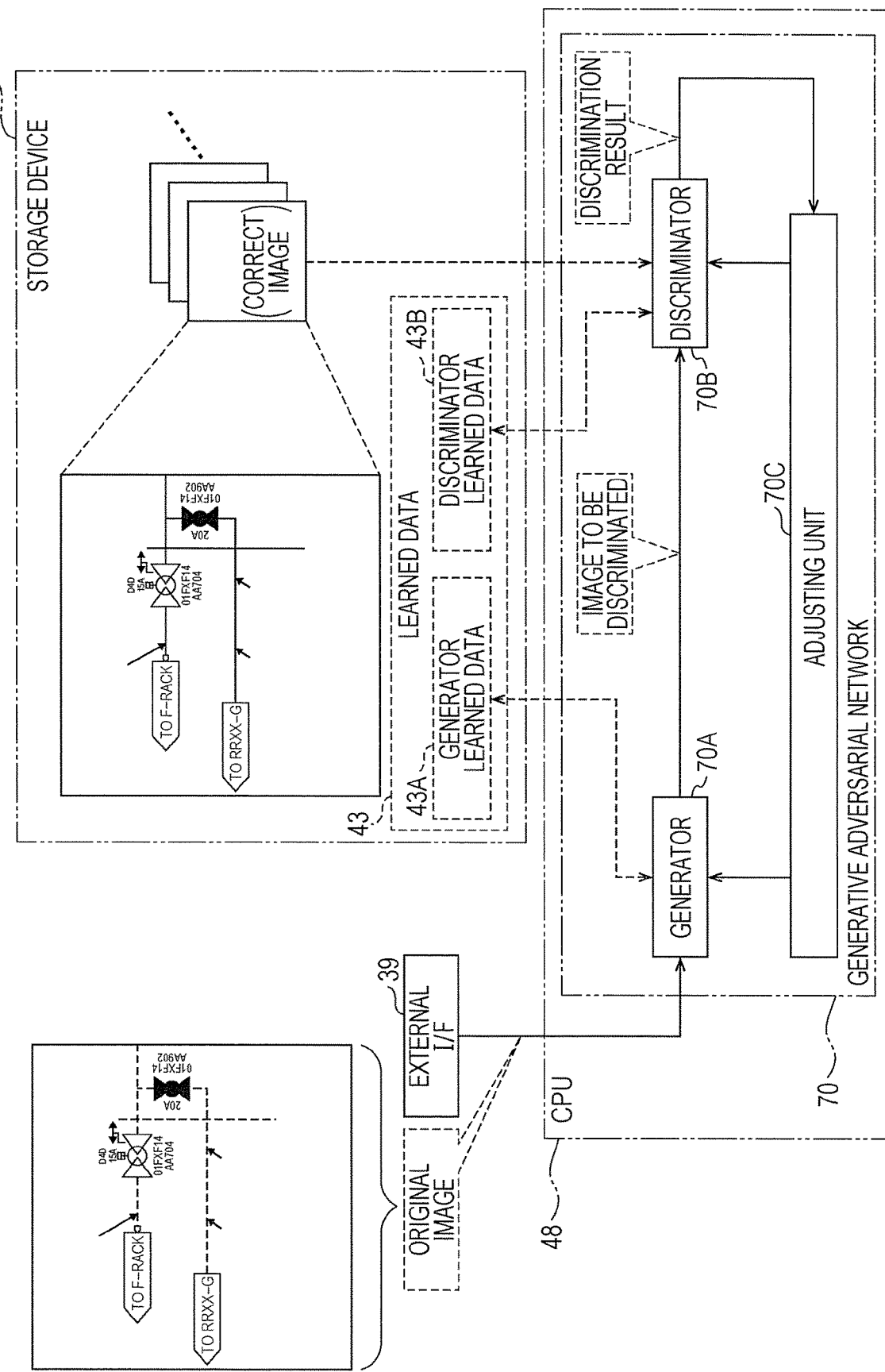
FIG. 3 is a block diagram illustrating an example of a configuration of a generative adversarial network according to the first exemplary embodiment.

For example, as illustrated in FIG. 3, the original image is given to the generator 70A from the external device through the external I/F 39. In the example illustrated in FIG. 3, an image obtained by reading a noted region P1 (see FIG. 17) set on a design drawing by the optical sensor 22 is illustrated as the original image. In the example illustrated in FIG. 3, the original image includes a broken line as an intermittent line.

Plural kinds of correct images are stored in the storage device 41. The plural kinds are, for example, several thousand kinds or more. The plural kinds of correct images are given to the discriminator 70B. In the example illustrated in FIG. 3, an image obtained by substituting the intermittent line included in the original image illustrated in FIG. 3 with a solid line is illustrated as a single correct image.

The generator 70A generates an image to be discriminated on the basis of the given original image so that the image to be discriminated becomes similar to the correct image. The discriminator 70B discriminates truth and falsehood of the image to be discriminated. The generator 70A learns to make the discriminator 70B falsely recognize the image to be discriminated as the correct image, and the discriminator 70B learns to correctly discriminate the image to be discriminated and the correct image. In this way, the generator 70A and the discriminator 70B advance learning by competing with each other. As a result, contents of the image to be discriminated generated by the generator 70A gradually become closer to contents of the correct image, and discrimination accuracy of the discriminator 70B gradually increases.

Eventually, the generator 70A and the discriminator 70B reach a Nash equilibrium. That is, false recognition of the discriminator 70B does not occur even in a case where the weight coefficient of the generator 70A is updated by the adjusting unit 70C, and the discrimination accuracy cannot be improved even in a case where the weight coefficient of the discriminator 70B is updated by the adjusting unit 70C. When a Nash equilibrium is reached, the image to be discriminated becomes extremely similar to the correct image. That is, the image to be discriminated becomes an image obtained by turning the intermittent line within the original image into a solid line.

In this way, the generative adversarial network 70 advances leaning of the generator 70A and the discriminator 70B until a Nash equilibrium is reached, and learned data 43 obtained by the learning is stored in the storage device 41. The learned data 43 includes generator learned data 43A and discriminator learned data 43B. The generator learned data 43A is learned data obtained by learning of the generator 70A, and the discriminator learned data 43B is learned data obtained by learning of the discriminator 70B.

Figure 4:
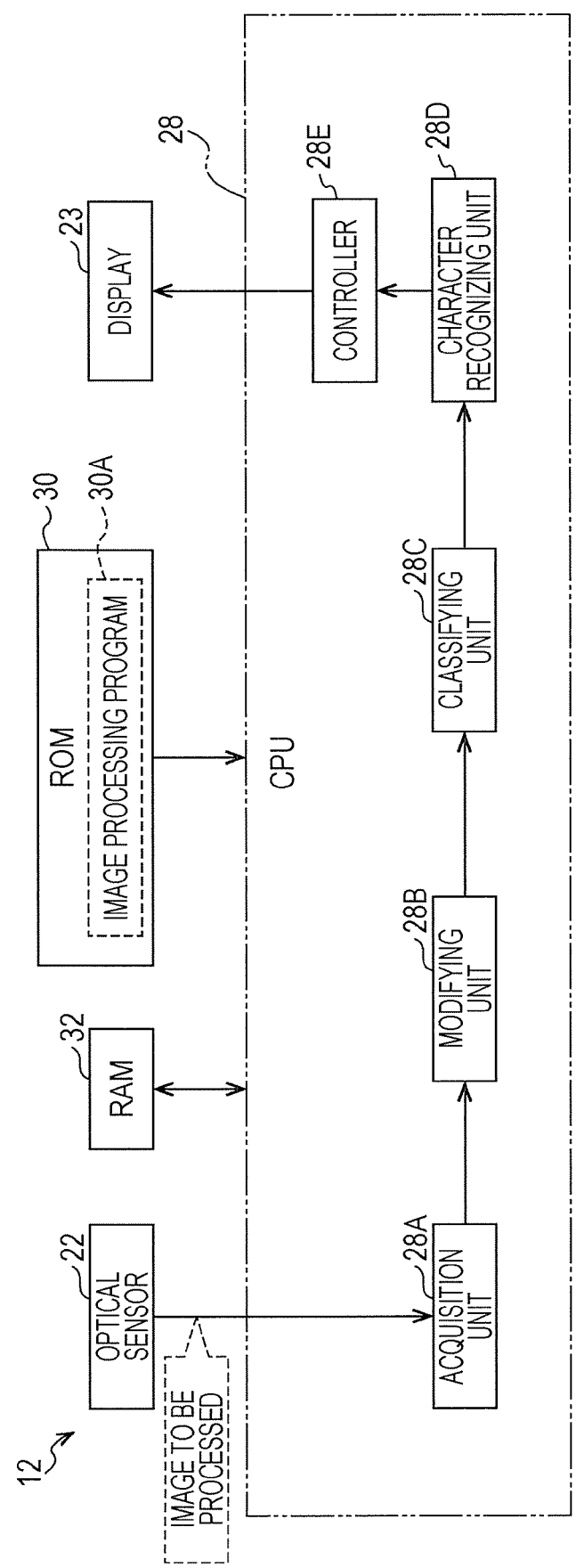
FIG. 4 is a block diagram illustrating an example of functions of a CPU according to the first exemplary embodiment.

For example, as illustrated in FIG. 4, an image processing program 30A is stored in the ROM 30 of the client device 12. The image processing program 30A is an example of a "program" according to the technique of the present disclosure. The CPU 28 reads out the image processing program 30A from the ROM 30 and loads the image processing program 30A thus read out into the RAM 32. The CPU 28 executes the image processing program 30A loaded into the RAM 32 and thus operates as an acquisition unit 28A, a modifying unit 28B, a classifying unit 28C, a character recognizing unit 28D, and a controller 28E.

The acquisition unit 28A acquires an image to be processed read from the noted region P1 set on the recording medium P (see FIG. 17) by the optical sensor 22. The modifying unit 28B modifies the image to be processed by turning an intermittent line within the image to be processed acquired by the acquisition unit 28A into a mark by using the generative adversarial network 70 in a stage prior to the classifying unit 28C. Specifically, the modifying unit 28B turns the intermittent line into a mark by turning the intermittent line within the image to be processed into a solid line.

The classifying unit 28C classifies the image into a character and a mark. In a case where the intermittent line included in the image is turned into a solid line in a stage prior to the classifying unit 28C, information included in the image is classified into a character and a mark by the classifying unit 28C since the classifying unit 28C determines that the solid line is a mark.

The character recognizing unit 28D performs character recognizing processing on a character region that will be described later. The controller 28E performs control for causing a character recognition result of the character recognizing processing in the character recognizing unit 28D to be displayed on the display 23.

Figure 5:
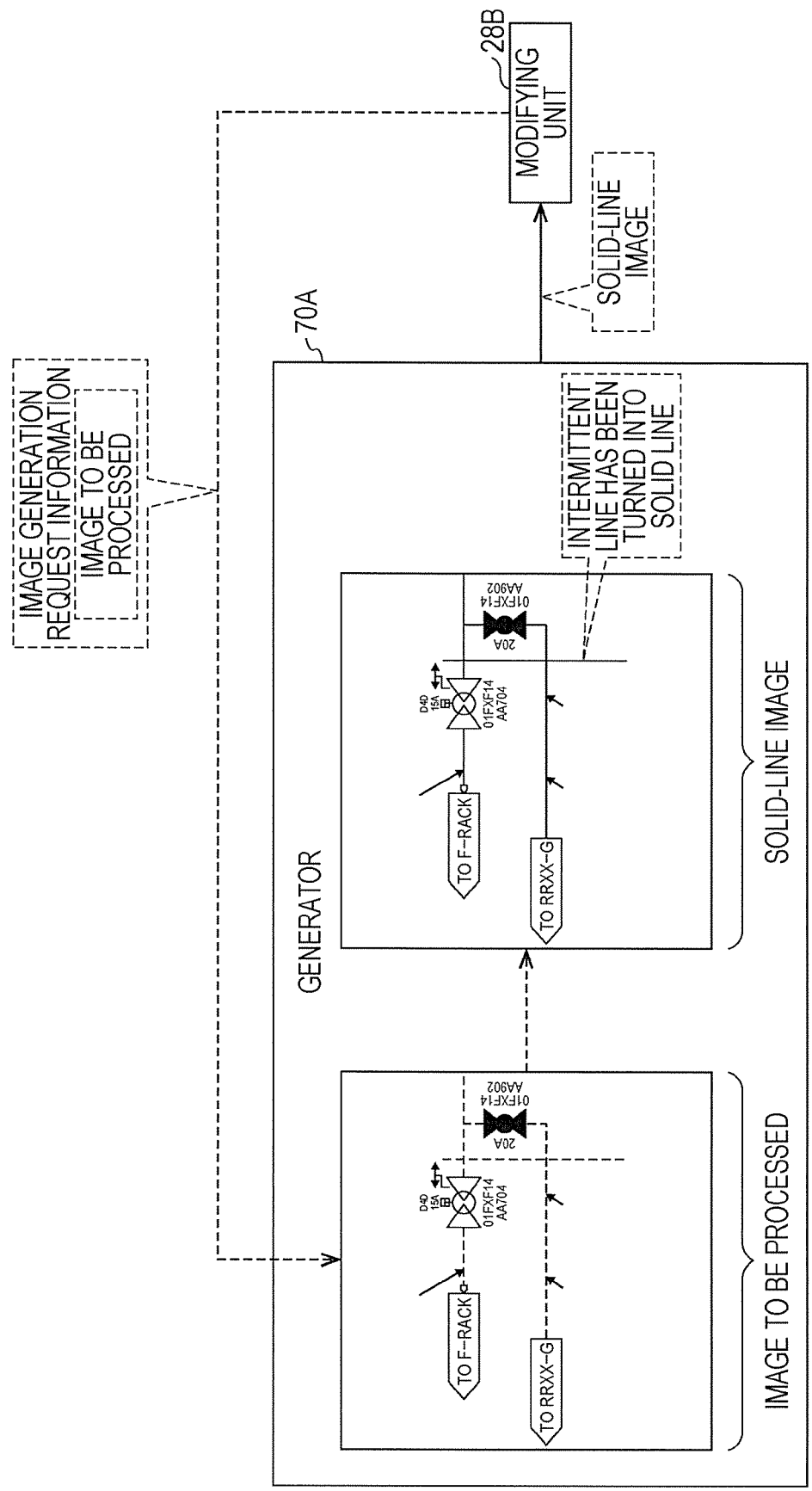
FIG. 5 is a conceptual diagram illustrating an example of contents of processing of a modifying unit and a generator according to the first exemplary embodiment.

For example, as illustrated in FIG. 5, the modifying unit 28B turns the intermittent line within the image to be processed into a solid line by using the generator 70A included in the generative adversarial network 70. That is, the modifying unit 28B causes the generator 70A that has learned by competing with the discriminator 70B included in the generative adversarial network 70 to turn the intermittent line within the image to be processed into a solid line. Specifically, the modifying unit 28B modifies the image to be processed by causing the generator 70A to generate a solid-line image by turning the intermittent line in the image to be processed acquired by the acquisition unit 28A into a solid line.

Although a broken line is illustrated as the intermittent line included in the image to be processed in the example illustrated in FIG. 5, the intermittent line is not limited to a broken line and may be a dotted line, a line with alternate long and short dashes, or a line with alternate long and two short dashes, and the shape of the intermittent line need not necessarily be a linear shape and may be a non-linear shape. Furthermore, the intermittent line need not have a constant thickness.

The modifying unit 28B transmits image generation request information to the generator 70A. The image generation request information is information that requests the generator 70A to generate a solid-line image from the image to be processed acquired by the acquisition unit 28A. The image generation request information includes the image to be processed acquired by the acquisition unit 28A.

The generator 70A receives the image generation request information transmitted from the modifying unit 28B and acquires the image to be processed from the received image generation request information. Then, the generator 70A generates a solid-line image from the image to be processed by using the generator learned data 43A (see FIG. 3) and transmits the generated solid-line image to the modifying unit 28B. The modifying unit 28B receives the solid-line image transmitted from the generator 70A.

Figure 6:
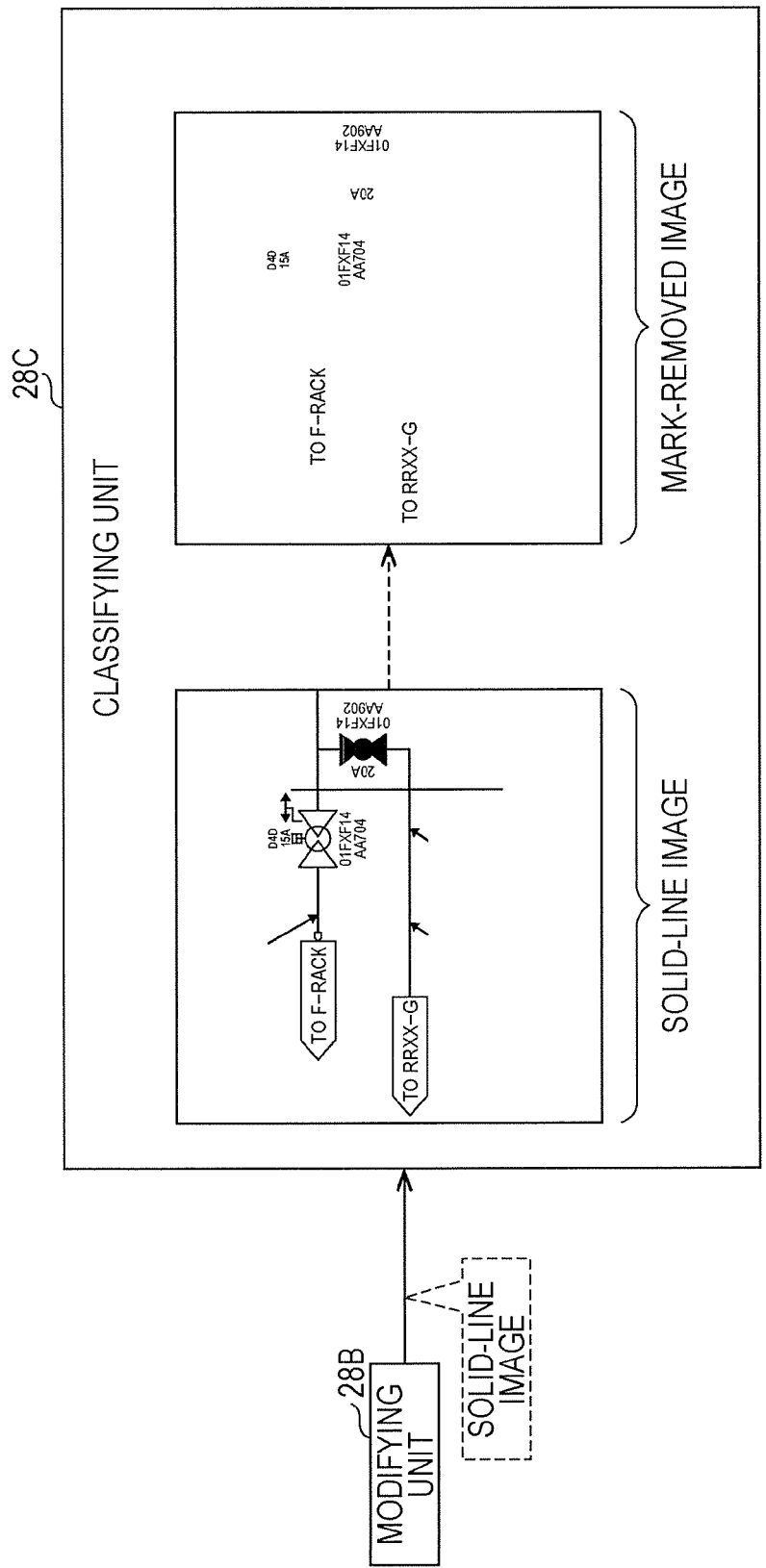
FIG. 6 is a conceptual diagram illustrating an example of contents of processing of the modifying unit and a classifying unit according to the first exemplary embodiment.

For example, as illustrated in FIG. 6, the modifying unit 28B supplies the received solid-line image to the classifying unit 28C. The classifying unit 28C classifies the solid-line image supplied from the modifying unit 283 into a character and a mark. The solid line included in the solid-line image is classified as a mark by the classifying unit 28C. That is, the intermittent line is not classified as a character unlike the case illustrated in FIG. 19 but is classified as a mark. The classifying unit 28C generates a mark-removed image that is an image obtained by removing the classified mark from the solid-line image.

Figure 7:
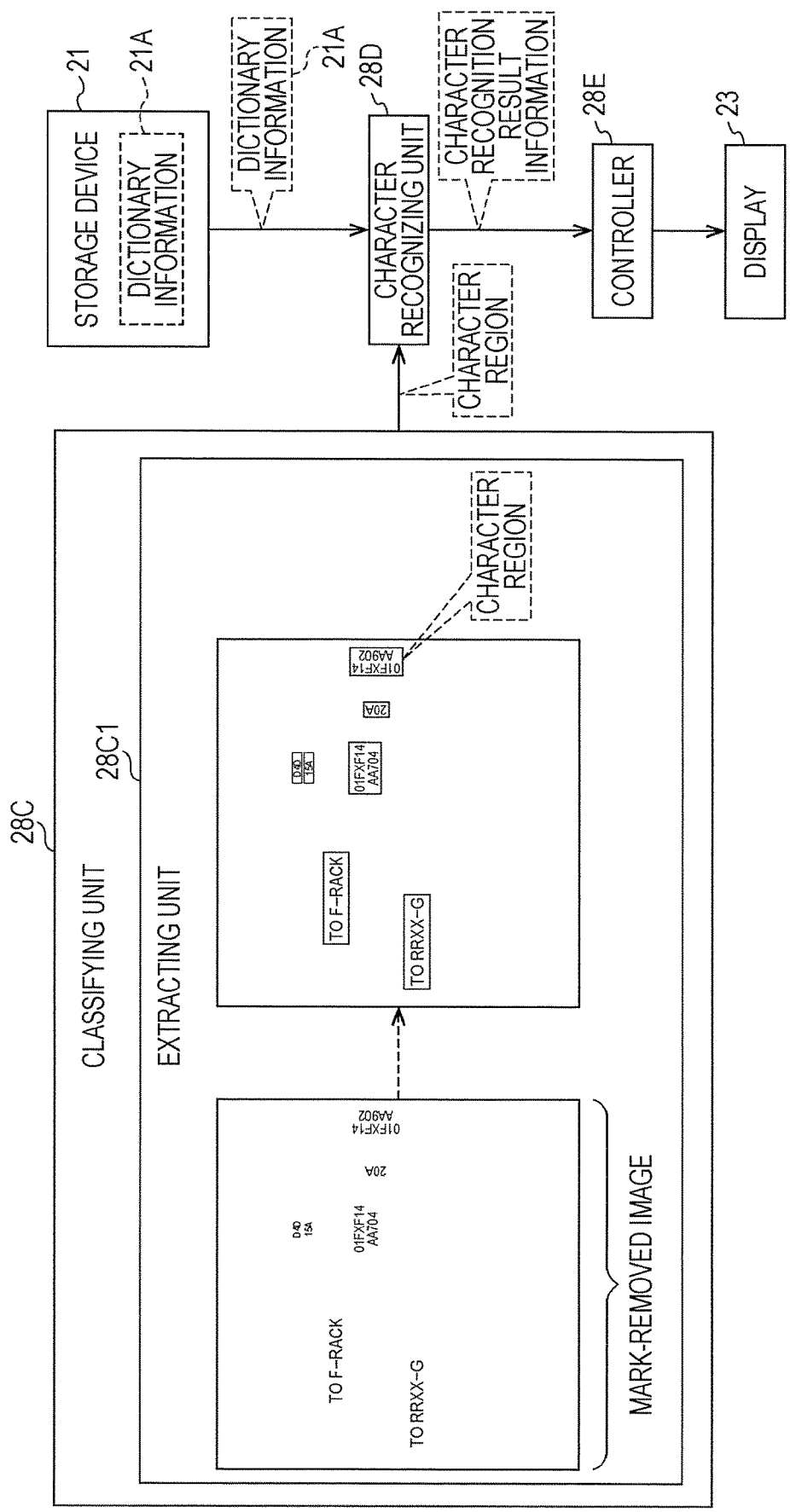
FIG. 7 is a conceptual diagram illustrating an example of processing contents of the classifying unit, a character recognizing unit, and a controller according to the first exemplary embodiment.

For example, as illustrated in FIG. 7, the classifying unit 28C includes an extracting unit 28C1. The extracting unit 28C1 extracts a character region including a character from the solid-line image. The character region is a rectangular image region including a character classified from the solid-line image by the classifying unit 28C. The solid-line image is an example of a "modified image" according to the technique of the present disclosure. The extracting unit 28C1 supplies the extracted character region to the character recognizing unit 28D.

Dictionary information 21A is stored in the storage device 21. The dictionary information 21A is information on a dictionary of character patterns used for OCR processing. The character recognizing unit 28D performs character recognition on the character region extracted by the extracting unit 28C1. That is, the character recognizing unit 28D performs character recognizing processing on the character region extracted by the extracting unit 28C1. The character recognizing processing is processing for recognizing a character included in the character region. The character recognizing processing includes OCR processing. The OCR processing is processing for cutting out character patterns from the character region one character by one character, comparing a character pattern thus cut out with character patterns stored in the dictionary information 21A by a method such as a pattern matching method, and outputting a character of a highest similarity.

The character recognizing unit 28D supplies character recognition result information indicative of a result of the character recognizing processing to the controller 28E. The character recognition result is, for example, a character output by the OCT processing. The controller 28E causes the character recognition result indicated by the character recognition result information supplied from the character recognizing unit 28D to be displayed on the display 23.

Next, operation of the image processing system 10 is described with reference to FIG. 8.

Figure 8:
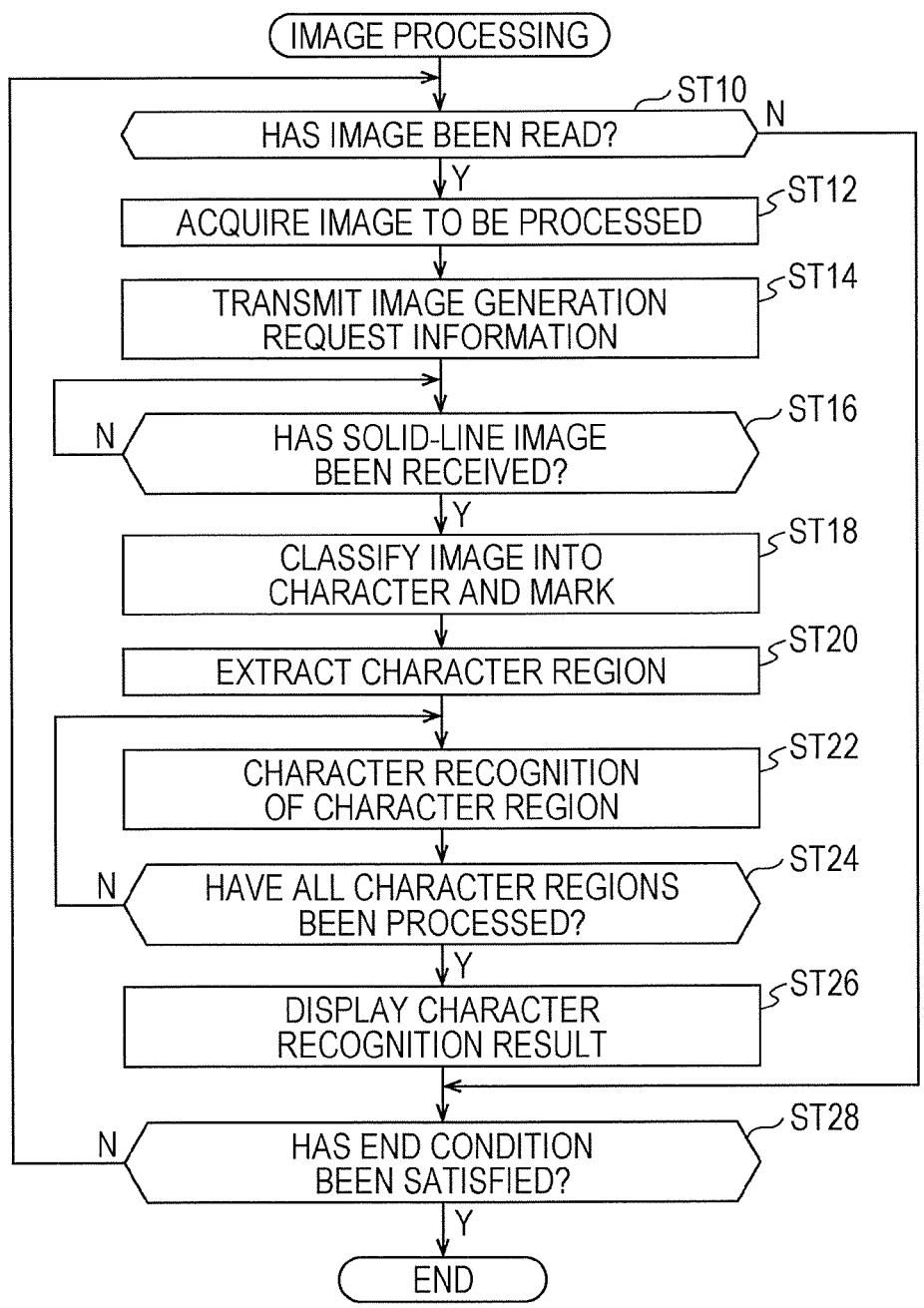
FIG. 8 is a flowchart illustrating an example of flow of image processing according to the first exemplary embodiment.

FIG. 8 illustrates an example of flow of image processing executed by the CPU 28 in accordance with the image processing program 30A in a state where the generator learned data 43A is stored in the storage device 41.

In the image processing illustrated in FIG. 8, first, in step ST10, the acquisition unit 28A determines whether or not an image to be processed has been read from the noted region P1 of the recording medium P by the optical sensor 22. In a case where an image to be processed has not been read from the noted region P1 of the recording medium P by the optical sensor 22 (No in step ST10), the image processing shifts to step ST28. In a case where an image to be processed has been read from the noted region P1 of the recording medium P by the optical sensor 22 (Yes in ST10), the image processing shifts to step ST12.

In step ST12, the acquisition unit 28A acquires the image to be processed from the optical sensor 22, and then the image processing shifts to step ST14.

In step ST14, the modifying unit 28B transmits image generation request information to the generator 70A, and then the image processing shifts to step ST16.

Through execution of the process in step ST14, the generator 70A acquires the image to be processed from the image generation request information and generates a solid-line image from the acquired image to be processed by using the generator learned data 43A. The generator 70A transmits the generated solid-line image to the modifying unit 28B.

In step ST16, the modifying unit 28B determines whether or not the solid-line image transmitted from the generator 70A has been received. In a case where the solid-line image transmitted from the generator 70A has not been received (No in step ST16), the determining process in step ST16 is performed again. In a case where the solid-line image transmitted from the generator 70A has been received (Yes in step ST16), the image processing shifts to step ST18.

In step ST18, the classifying unit 28C classifies the solid-line image into a character and a mark, and then the image processing shifts to step ST20. Through execution of the process in step ST18, a mark-removed image obtained by removing a mark from the solid-line image is generated.

In step ST20, the extracting unit 28C1 extracts a character region from the mark-removed image, and then the image processing shifts to step ST22.

In step ST22, the character recognizing unit 28D performs character recognizing processing on the character region extracted by the extracting unit 28C1, and then the image processing shifts to step ST24.

In step ST24, the character recognizing unit 28D determines whether or not the process in step ST22 has been executed on all character regions of the mark-removed image. In a case where the process in step ST22 has been executed on not all character regions of the mark-removed image (No in step ST24), the image processing shifts to step ST22. In a case where the process in step ST22 has been executed on all character regions of the mark-removed image (Yes in step ST24), the image processing shifts to step ST26.

In step ST26, the controller 28E causes a character recognition result of the character recognizing processing in the character recognizing unit 28D to be displayed on the display 23, and then the image processing shifts to step ST28.

In step ST28, the controller 28E determines whether or not a condition to end the image processing (hereinafter referred to as an "image processing end condition") has been satisfied. Examples of the image processing end condition include a condition that an instruction to end the image processing has been received by the receiving device 24. In a case where the image processing end condition has not been satisfied (No in step ST28), the image processing shifts to step ST10. In a case where the image processing end condition has been satisfied (Yes in step ST28), the image processing ends.

As described above, in the image processing system 10, an intermittent line within an image to be processed acquired by the acquisition unit 28A is turned into a mark by the modifying unit 28B by using the generative adversarial network 70 in a stage before the classifying unit 28C classifies the image to be processed into a character and a mark. Although the intermittent line is classified not as a mark but as a character by the classifying unit 28C since the classifying unit 28C classifies the image to be processed into a mark and a character on the basis of a size, a shape, and the like of a pixel connecting component, the intermittent line is turned into a solid line by the modifying unit 28B and is thus turned into a mark, and thereby information included in the solid-line image is classified into a character and a mark by the classifying unit 28C. As a result, no intermittent line is included in the character region extracted by the extracting unit 28C1, and an effective character recognition result is obtained by character recognizing processing performed on a character region by the character recognizing unit 28D.

Although an example in which the modifying unit 28B causes the generator 70A that has learned in the server device 14 to generate a solid-line image has been described in the first exemplary embodiment, the technique of the present disclosure is not limited to this. For example, the modifying unit 28B may acquire the generator learned data 43A from the generator 70A that has learned by competing with the discriminator 70B of the generative adversarial network 70 and turn an intermittent line into a solid line by using the acquired generator learned data 43A. That is, the modifying unit 28B may modify the image to be processed by generating a solid-line image on which an intermittent line has been turned into a solid line from the image to be processed acquired by the acquisition unit 28A by using the generator learned data 43A. The generator learned data 43A is an example of a "learning result" according to the technique of the present disclosure.

Figure 9:
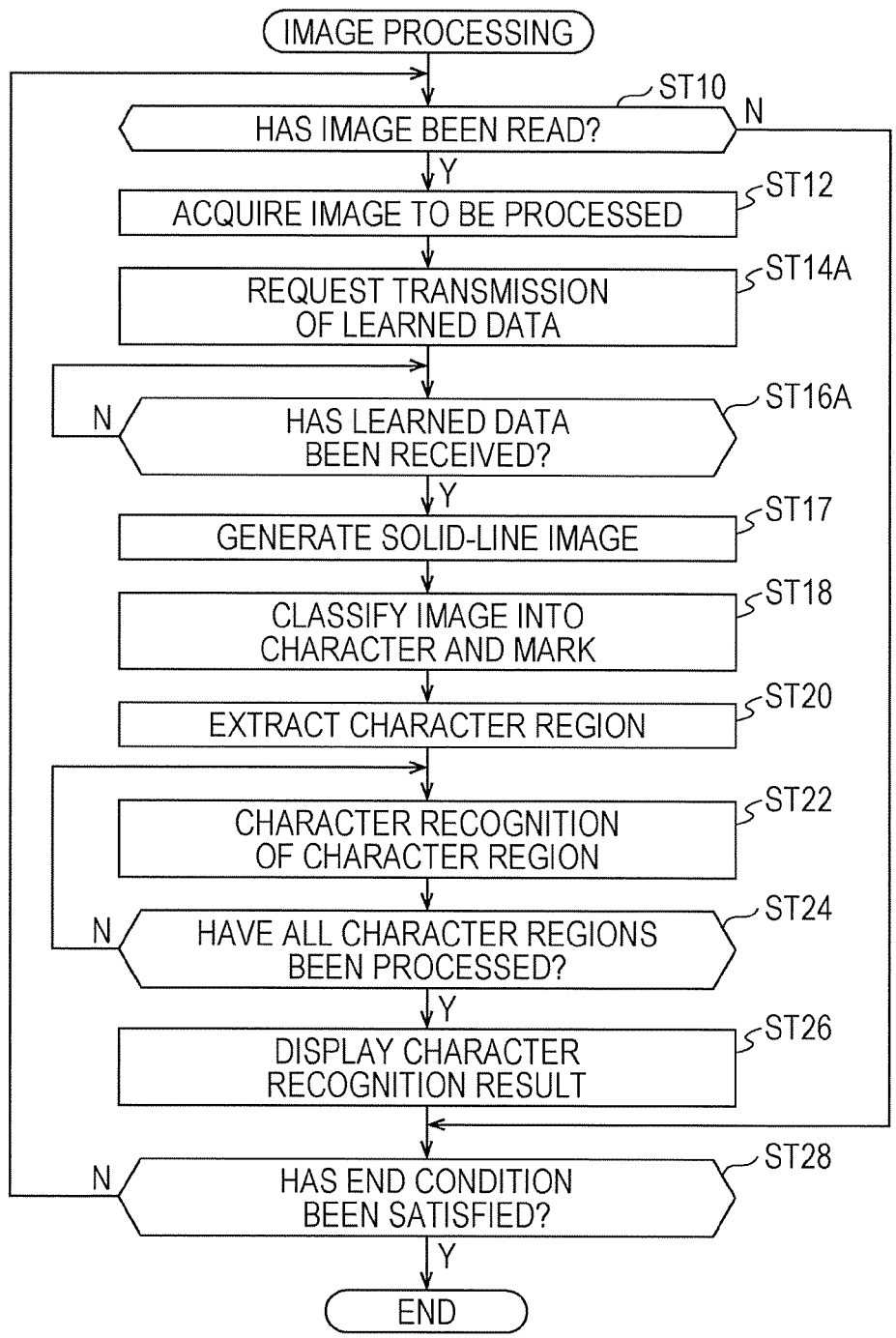
FIG. 9 is a flowchart illustrating a modification of flow of the image processing according to the first exemplary embodiment.

In this case, the image processing illustrated in FIG. 9 is executed by the CPU 28. The image processing illustrated in FIG. 9 is different from the image processing illustrated in FIG. 8 in that the image processing illustrated in FIG. 9 includes step ST14A instead of step ST14, includes step ST16A instead of step ST16, and includes step ST17.

In step ST14A included in the image processing illustrated in FIG. 9, the modifying unit 28B requests the server device 14 to transmit the generator learned data 43B, and then the image processing shifts to step ST16A. The CPU 48 of the server device 14 acquires the generator learned data 43A from the storage device 41 in response to the request from the modifying unit 28B and transmits the acquired generator learned data 43A to the modifying unit 28B.

In step ST16A, the modifying unit 28B determines whether or not the generator learned data 43A transmitted from the CPU 48 of the server device 14 has been received. In a case where the generator learned data 43A transmitted from the CPU 48 of the server device 14 has not been received (No in step ST16A), the determining process in step ST16A is performed again. In a case where the generator learned data 43A transmitted from the CPU 48 of the server device 14 has been received (Yes in step ST16A), the image processing shifts to step ST17.

In step ST17, the modifying unit 28B generates a solid-line image by turning an intermittent line within an image to be processed into a solid line by using the generator learned data 43A, and then the image processing shifts to step ST18.

Although an example in which the client device 12 acquires the generator learned data 43 over the communication network 60 by communicating with the server device 14 and the modifying unit 28B functions as the generator 70A has been described in the example illustrated in FIG. 9, the technique of the present disclosure is not limited to this. For example, the generator 70A and the generator learned data 43A may be transferred to the client device 12 by using a storage medium such as a USB memory or an SSD.

Figure 10:
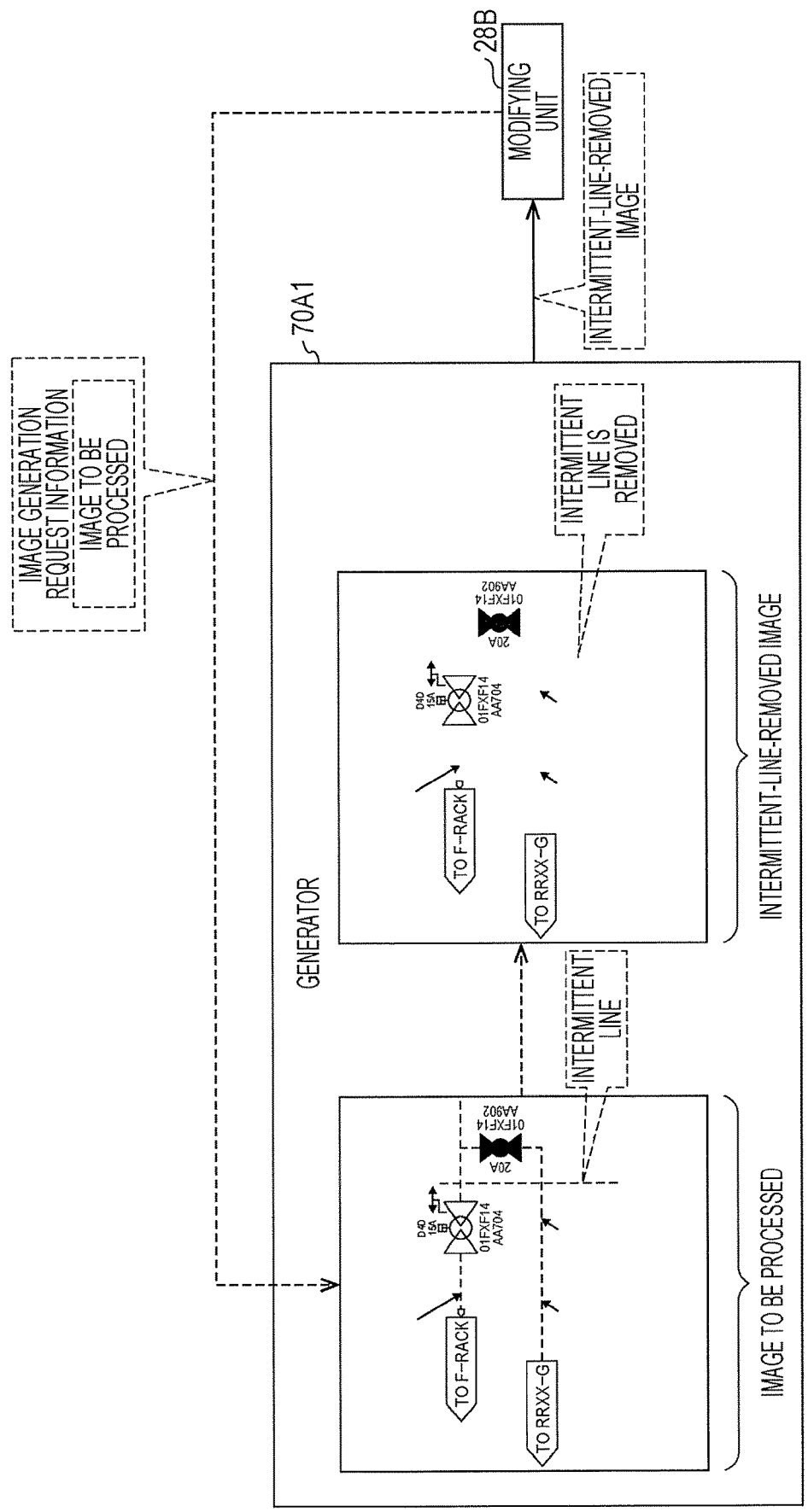
FIG. 10 is a conceptual diagram illustrating a modification of contents of processing of the modifying unit and the generator according to the first exemplary embodiment.

Although an example in which an intermittent line is turned into a solid line has been described in the first exemplary embodiment, the technique of the present disclosure is not limited to this. For example, the modifying unit 28B may modify an image to be processed by removing an intermittent line by using a generative adversarial network. In this case, for example, as illustrated in FIG. 10, the modifying unit 28B removes an intermittent line by using a generator 70A1. The generator 70A1 is a generator that learns so as to remove an intermittent line by competing with a discriminator included in a generative adversarial network.

The modifying unit 28B causes the generator 70A1 that has learned to remove an intermittent line by competing with the discriminator included in the generative adversarial network to remove an intermittent line. That is, for example, as illustrated in FIG. 10, the modifying unit 28B modifies an image to be processed by causing the generator 70A1 to generate an intermittent-line-removed image obtained by removing an intermittent line from the image to be processed. The modifying unit 28B acquires the intermittent-line-removed image generated by the generator 70A1. The classifying unit 28C classifies information included in the intermittent-line-removed image into a character and a mark.

Although the modifying unit 28B causes the generator 70A1 to generate an intermittent-line-removed image in the example illustrated in FIG. 10, the technique of the present disclosure is not limited to this. For example, the modifying unit 28B may acquire generator learned data that is a result of learning of the generator 70A1 that has learned to remove an intermittent line by competing with the discriminator included in the generative adversarial network and remove an intermittent line by using the acquired generator learned data. That is, the modifying unit 28B may modify an image to be processed by generating an intermittent-line-removed image from the image to be processed by using the generator learned data.

Second Exemplary Embodiment

Although an example in which processing for generating a solid-line image is applied to an entire region of a recording medium P has been described in the first exemplary embodiment, an example in which processing for generating a solid-line image is applied to a partial region of the recording medium P is described in the second exemplary embodiment. In the following description, constituent elements similar to those in the first exemplary embodiment are given identical reference signs, and description thereof is omitted.

For example, as illustrated in FIG. 1, an image processing system 10A according to the second exemplary embodiment is different from the image processing system 10 described in the first exemplary embodiment in that a client device 12A is provided instead of the client device 12.

Figure 11:
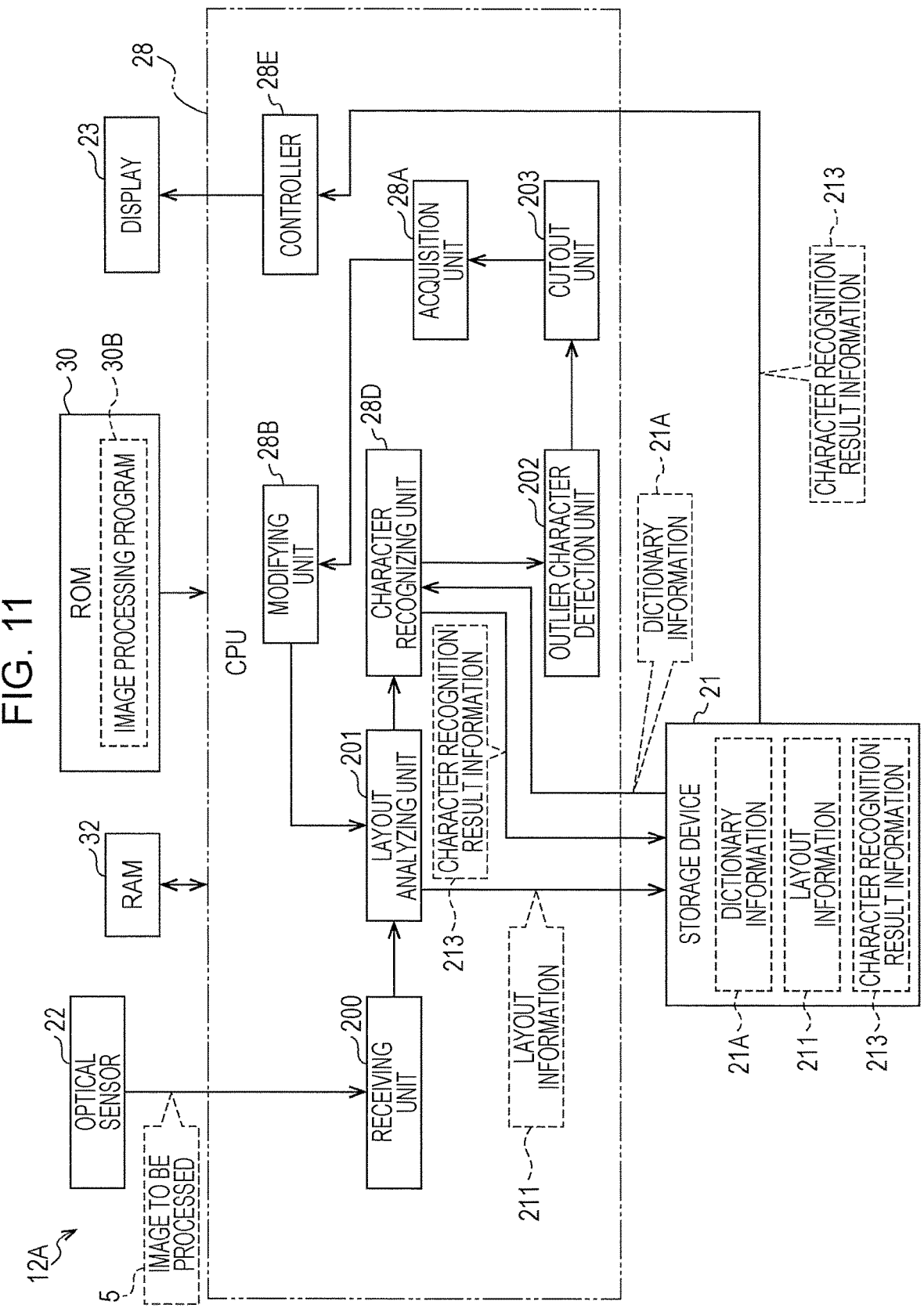
FIG. 11 is a block diagram illustrating an example of functions of a CPU according to the second exemplary embodiment.

For example, as illustrated in FIG. 11, in the client device 12A, an image processing program 30B is stored in a ROM 30. The image processing program 30B is an example of a "program" according to the technique of the present disclosure. A CPU 28 reads out the image processing program 30B from the ROM 30 and loads the image processing program 30B thus read out into a RAM 32. The CPU 28 operates as an acquisition unit 28A, a modifying unit 28B, a character recognizing unit 28D, a controller 28E, a receiving unit 200, a layout analyzing unit 201, an outlier character detection unit 202, and a cutout unit 203 by executing the image processing program 30B loaded into the RAM 32.

Figure 12A:
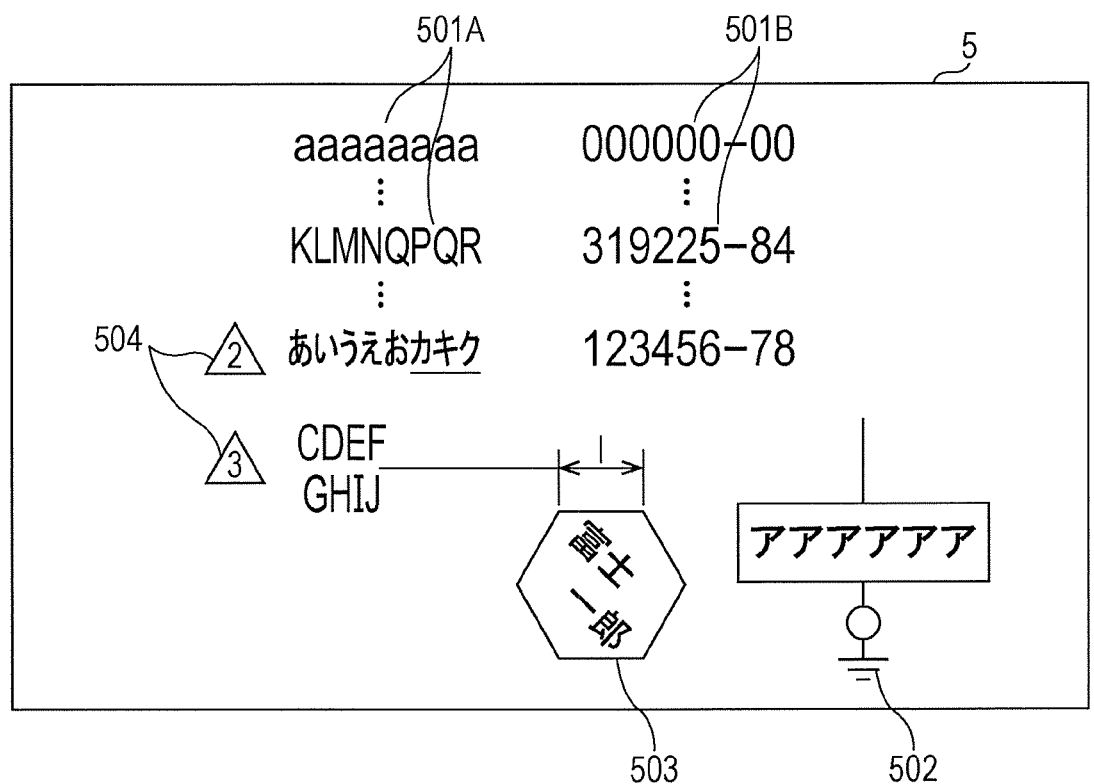
FIG. 12A is a conceptual diagram illustrating an example of an image to be processed before layout analysis is performed by a layout analyzing unit according to the second exemplary embodiment.

The receiving unit 200 receives an image to be processed 5 read by an optical sensor 22. For example, as illustrated in FIG. 12A, the image to be processed 5 includes, for example, figure information such as a wiring diagram 502, a design drawing 503, and a modification sign 504 in addition to character information such as a character string 501A. In the example illustrated in FIG. 12A, character strings 501A and 501B are illustrated. The character string 501A is a character string including alphabets, hiragana, katakana, kanji, and characters of other languages. The character string 501B is a character string of numerals.

Figure 12B:
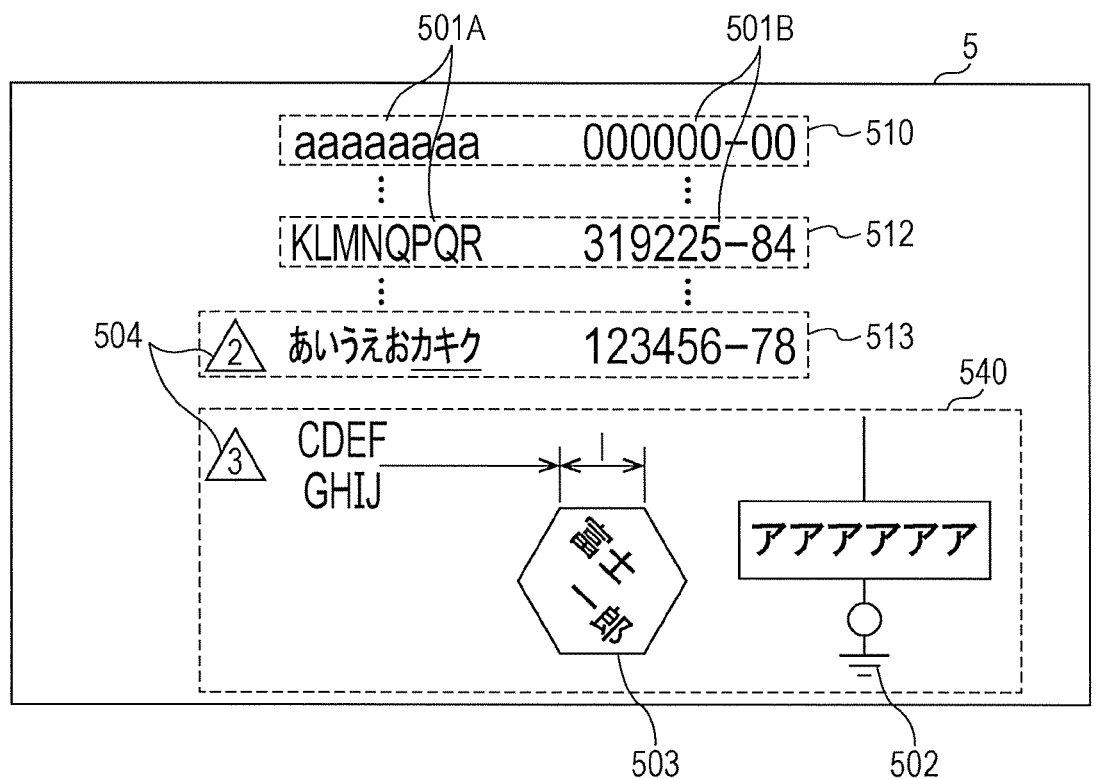
FIG. 12B is a conceptual diagram illustrating an example of an image to be processed after layout analysis is performed by the layout analyzing unit according to the second exemplary embodiment.

For example, as illustrated in FIG. 12B, the layout analyzing unit 201 divides the image to be processed 5 into partial regions 510, 512, 513, and 540 by executing layout analysis on the image to be processed 5 received by the receiving unit 200. A known algorithm may be used for the layout analysis.

For example, the layout analysis may be performed by a method (XY-cut method) for acquiring a frequency distribution (also referred to as a "histogram") of black pixels projected in a lateral direction and a longitudinal direction of an image, specifying a minimal value (also referred to as a "valley in a marginal distribution") and a maximal value (also referred to as a "mountain in the marginal distribution") of the histogram in each direction, and recursively repeating division of the image while using a pixel that gives the minimal value or the maximal value as a boundary when the minimal value or the maximal value meets a specific condition.

For example, as illustrated in FIG. 11, the layout analyzing unit 201 causes information 211 (hereinafter referred to as "layout information 211") concerning the partial regions 510, 512, 513, and 540 obtained by dividing the image to be processed 5 by the layout analysis to be stored in a storage device 21. The layout information 211 includes, for example, information indicative of sizes and attributes (e.g., a character string, a table, a figure) of the partial regions 510, 512, 513, and 540 and region position information indicative of positions of the partial regions 510, 512, 513, and 540 on the image to be processed 5.

The character recognizing unit 28D performs character recognizing processing on the partial regions 510, 512, 513, and 540 for each of the partial regions 510, 512, 513, and 540 obtained by dividing the image to be processed 5 by the layout analyzing unit 201. The character recognizing processing is an example of a "character recognizing function" according to the technique of the present disclosure.

The character recognizing unit 28D causes a character recognition result to be stored as character recognition result information 213 in a storage device 41, for example, in a text form in association with the partial regions 510, 512, 513, and 540. The character recognition result information 213 includes information such as character information, character position information, and character size information. The character information is information indicative of a character or a character string recognized by the character recognizing processing. The character position information is information indicative of a position of the recognized character or character string on the image. The character size information is information indicative of a size such as a width, a height, and the like of the recognized character.

In a case where the character recognition result information 213 is already stored in the storage device 21, the character recognizing unit 28D updates the character recognition result information 213 by substituting the already stored character recognition result information 213 with newly acquired character recognition result information 213 when character recognition result information 213 within a specific partial region is newly acquired.

The outlier character detection unit 202 detects a character (hereinafter also referred to as an "outlier character") having an attribute deviated from an average attribute for all characters included in the image to be processed 5 corresponding to the character recognition result information 213 from the character recognition result information 213 obtained by the character recognizing unit 28D. The outlier character is an example of a character that meets a predetermined condition.

For example, the outlier character detection unit 202 detects a character having a size (also referred to as an "abnormal value") outside a predetermined range as an outlier character. As for a character size, only a width of a character may be used as an index, only a height of a character may be used as an index, or a value evaluating a combination of a width and a height may be used.

Specifically, the outlier character detection unit 202 calculates a distribution of sizes of characters recognized by the character recognizing processing executed on the whole image to be processed 5 by the character recognizing unit 28D and detects an outlier character whose size is an abnormal value on the basis of the calculated distribution. More specifically, the outlier character detection unit 202 may calculate a distribution of sizes of characters by using a statistical method such as the Smirnov-Grubbs test.

This is described in more detail below by using a specific example with reference to FIGS. 13A and 13B. FIGS. 13A and 13B illustrate an example of a list of sizes of recognized characters, FIG. 13A illustrates an example of a list of sizes of alphabets ("KLMNQPQR") within the partial region 512 illustrated in FIG. 12A, and FIG. 13B illustrates an example of a list of sizes of alphabets ("CDEFGHIJ") within another partial region 540 illustrated in FIG. 12B. A unit is the number of pixels.

FIG. 13A corresponds to an example in which the characters have been correctly recognized by the character recognizing unit 28D, and FIG. 13B corresponds to an example in which the characters have been falsely recognized by the character recognizing unit 28D ("∴; ◉1 ≡ |UV"). The expression "the characters have been correctly recognized" means that characters actually written have been recognized, and the expression "the characters have been falsely recognized" means that characters different from the characters actually written have been recognized. The case where "the characters have been falsely recognized" corresponds, for example, to a case where the character recognizing unit 202 falsely recognizes, as a single character, plural characters or a part of a single character, for example, because a partial region on which the character recognizing processing is performed is inappropriate.

As illustrated in FIG. 13A, in a case where characters are correctly recognized by the character recognizing unit 28D, widths and heights of the recognized characters are substantially equal to one another. Meanwhile, as illustrated in FIG. 13B, in a case where characters are falsely recognized by the character recognizing unit 28D, a variation (dispersion) of the widths and heights of the characters is large as compared with the example illustrated in FIG. 13A.

The outlier character detection unit 202 calculates, for example, an average and a standard deviation of sizes of the characters recognized by character recognizing processing executed on the whole image to be processed 5 by the character recognizing unit 28D. Next, the outlier character detection unit 202 calculates a value (hereinafter also referred to as an "evaluation value") obtained by dividing a difference (e.g., an absolute value) between a size of a target character and the average by the standard deviation. Next, the outlier character detection unit 202 may detect the character as an outlier character whose character size is an abnormal value when the calculated evaluation value exceeds a predetermined threshold value.

The average indicates an average size of characters included in the whole image to be processed 5 and may be called an estimation value for estimating a size of a character to be detected. The standard deviation is an example of a second index value. A range indicated by a value obtained by multiplying the standard deviation by the threshold value corresponds to a predetermined range. That is, the threshold value is an example of a value used to specify a predetermined range by using the standard deviation.

For example, in a case where an average of the characters included in the whole image to be processed 5 is 35.5 (pixels) and a standard deviation of the characters included in the whole image to be processed 5 is 4.5, calculated evaluation values are as indicated in Table 1 in the example of the character recognizing processing performed on the partial region 540 illustrated in FIG. 12B assume that the threshold value is, for example, 2.0.

| | width | | height | |
|---|---|---|---|---|
| character | difference from average | evaluation value | difference from average | evaluation value |
| ∴ | 425.5 | 94.5 | 1331.5 | 335.9 |
| ; | 40.5 | 9.0 | 858.5 | 229.4 |
| ◉ | 228.5 | 50.7 | 879.5 | 235.1 |
| 1 | 172.5 | 38.3 | 991.5 | 265.0 |
| ≡ | 9.5 | 2.1 | 987.5 | 263.9 |
| I | 164.5 | 36.5 | 991.5 | 265.0 |
| U | 0.5 | 0.1 | 1.5 | 0.4 |
| V | 4.5 | 1.0 | 0.5 | 0.1 |

In such a case, the outlier character detection unit 202 detects, as outlier characters, characters "∴", ";", "◉", "1", "≡", and "|" whose evaluation values exceed the threshold value of 2.0.

Although a character whose size is an abnormal value is regarded as an outlier character in the above example, the outlier character is not limited to this, and for example, a character having a font different from other characters or a character having a type different from other characters may be regarded as an outlier character. Although an average and a standard deviation of sizes of characters recognized on the whole image to be processed 5 are calculated, a calculation method is not limited to this, and for example, an average and a standard deviation of sizes of characters included in each partial region may be calculated. Alternatively, arrangement of character strings is subjected to language analysis or learning, and whether or not unrealistic arrangement of a character string appears may be used as an index. The unrealistic arrangement of a character string is, for example, arrangement of characters that is not included in a dictionary or arrangement of successive symbol characters.

Figure 14:
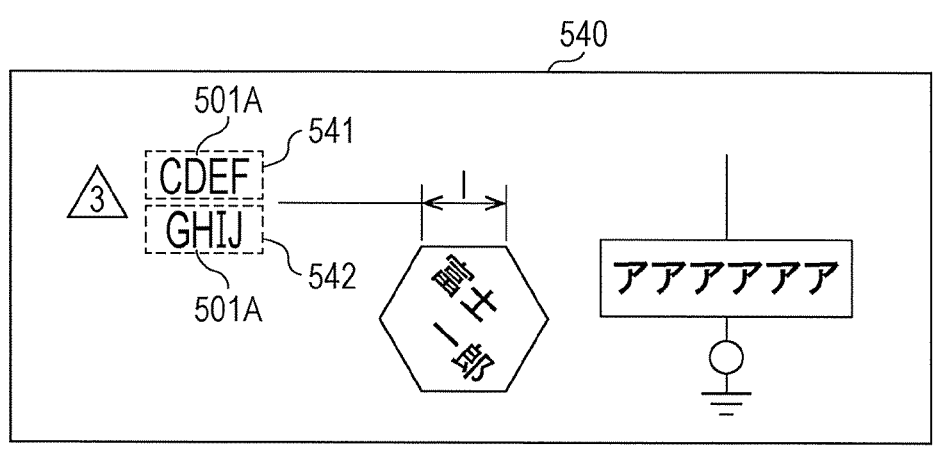
FIG. 14 is a conceptual diagram illustrating an example of a partial region cut out by a cutout unit according to the second exemplary embodiment.

FIG. 14 illustrates an example of the partial region 540 that has been cut out. The cutout unit 203 specifies the partial region 540 including outlier characters ("∴; ◉1 ≡ |UV") from among the partial regions 510, 512, 513, and 540 on the basis of a result of detection of the outlier character detection unit 202 and cuts out the specified partial region 540. The number of partial regions cut out by the cutout unit 203 may be 1 or may be more than 1.

The cutout unit 203 may specify a partial region including a single outlier character as a cutout region or may specify a partial region including a predetermined number of outlier characters as a cutout region. In a case where a partial region including plural outlier characters is cut out, the cutout unit 203 may specify the partial region as a cutout region when a ratio of the number of outlier characters to the number of characters included in the partial region (also referred to as a "character string length of the partial region") is equal to or more than a certain value.

The acquisition unit 28A acquires the partial region 540 cut out by the cutout unit 203. That is, the acquisition unit 28A acquires the partial region 540 in which a character has been falsely recognized by the character recognizing processing among the partial regions 510, 512, 513, and 540 obtained by dividing a character recognition target image decided as a target of character recognition by the character recognizing processing.

The modifying unit 28B executes the processing described in the first exemplary embodiment on the partial region 540 acquired by the acquisition unit 28A and supplies the processed partial region 540 to the layout analyzing unit 201. The layout analyzing unit 201 is an example of a "classifying unit" according to the technique of the present disclosure.

The layout analyzing unit 201 further performs layout analysis on the partial region 540 cut out by the cutout unit 203 and processed by the modifying unit 28B. For example, as illustrated in FIG. 14, the layout analyzing unit 201 further divides the partial region 540 into partial regions 541 and 542 (hereinafter also referred to as "divided regions 541 and 542" so as to be distinguished from the "partial regions of the image to be processed 5"). The divided regions 541 and 542 are an example of a divided region. The layout analysis method performed here may be identical to the aforementioned layout analysis method or may be different from the aforementioned layout analysis method.

The character recognizing unit 28D performs character recognizing processing (i.e., another character recognizing processing) on the divided regions 541 and 542. The character recognizing unit 28D may perform another character recognizing processing only in a case where the partial region 54 is divided into plural divided regions 541 and 542 and may be configured not to perform another character recognizing processing in a case where the partial region 540 is not divided. Alternatively, an operator may check a divided region including an abnormal value, and in a case where the operator determines that another character recognizing processing is unnecessary, another character recognizing processing may be omitted.

Figure 15A:
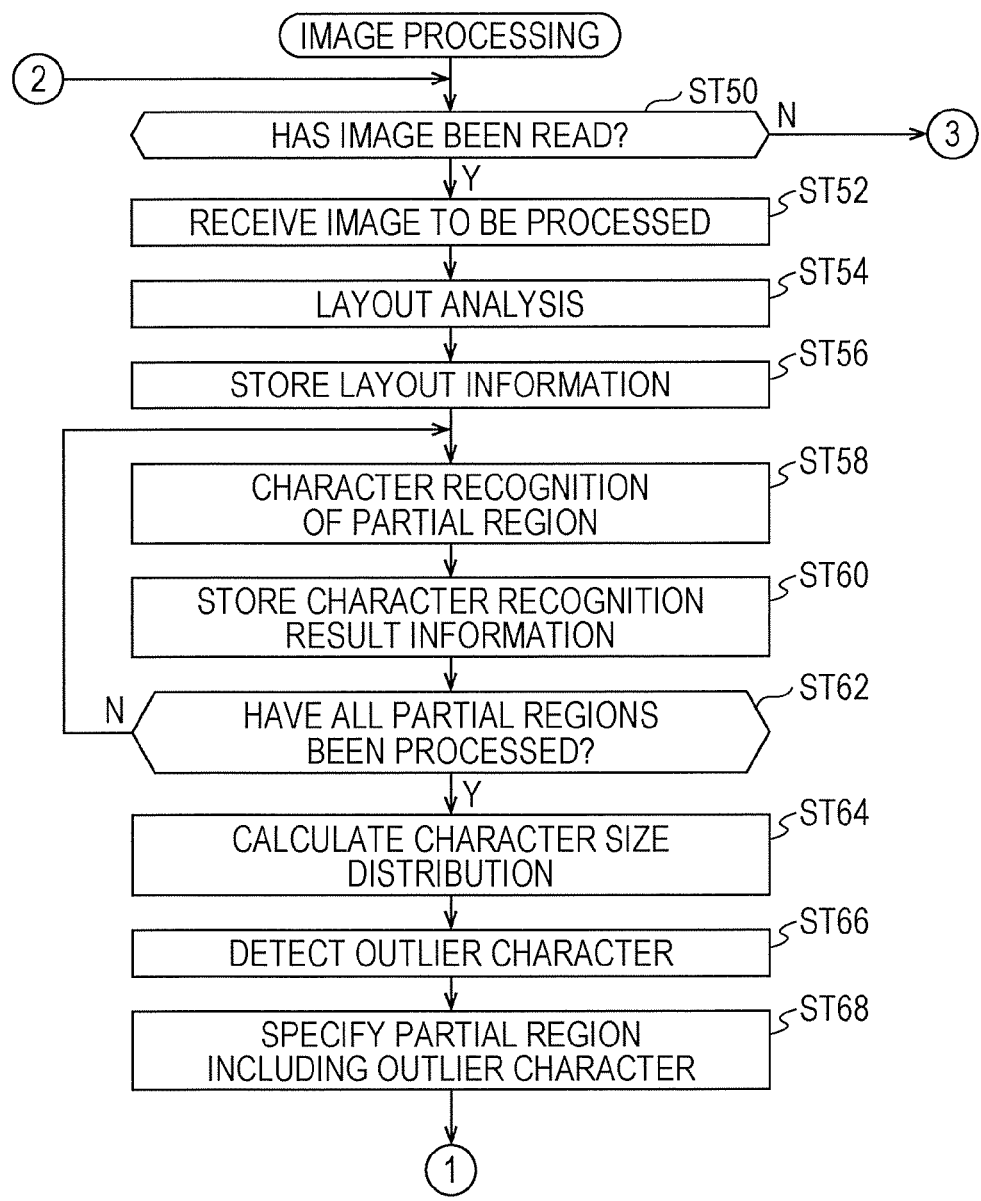
FIG. 15A is a flowchart illustrating an example of flow of image processing according to the second exemplary embodiment.
Figure 15B:
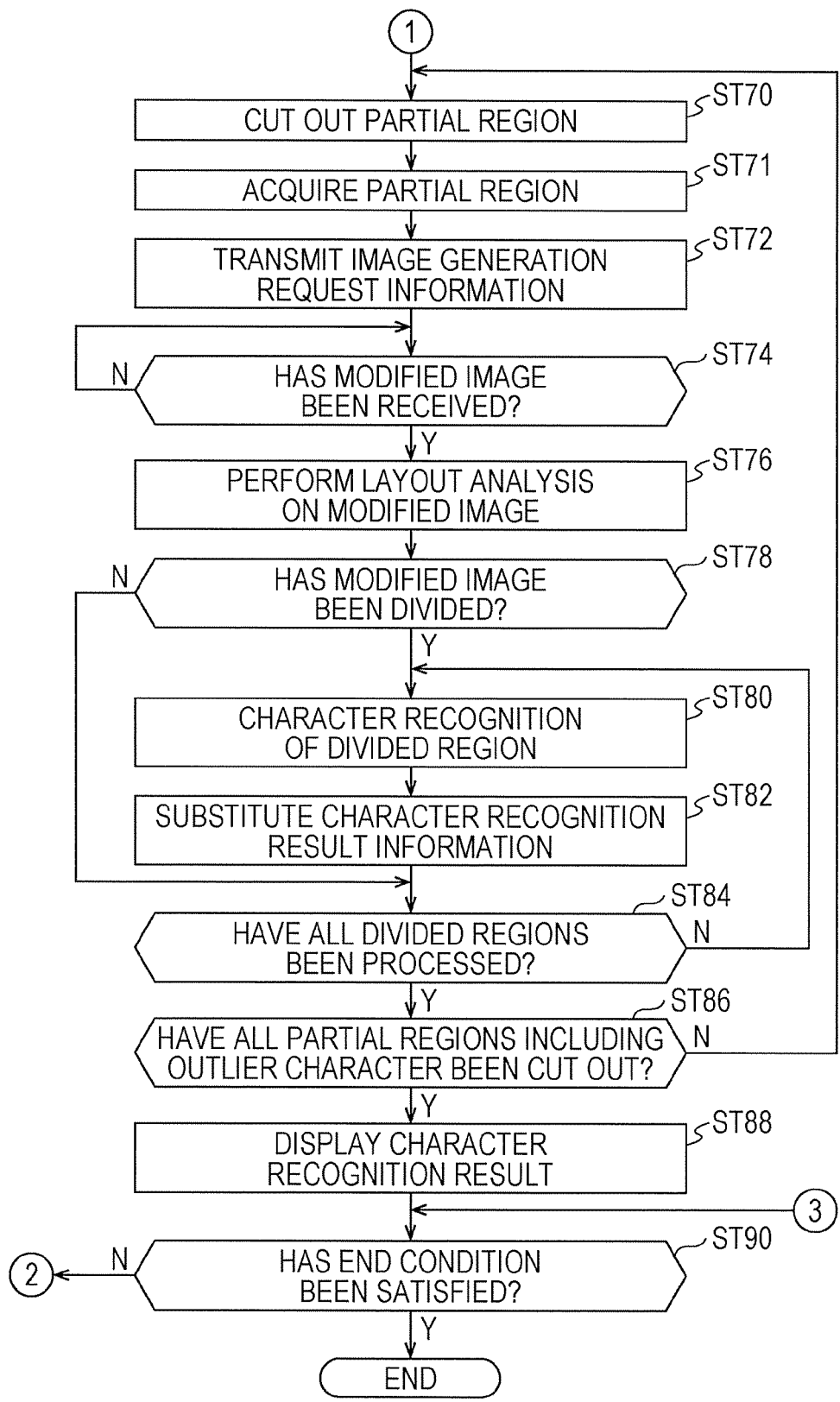
FIG. 15B is continuation of the flowchart illustrated in FIG. 15A.

Next, operation of the image processing system 10A according to the second exemplary embodiment is described with reference to FIGS. 15A and 15B. FIGS. 15A and 15B illustrate an example of flow of image processing according to the second exemplary embodiment.

In the image processing illustrated in FIG. 15A, first, in step ST50, the receiving unit 200 determines whether or not the image to be processed 5 has been read from the noted region P1 of the recording medium P by the optical sensor 22. In a case where the image to be processed 5 has not been read from the noted region P1 of the recording medium P by the optical sensor 22 (No in step ST50), the image processing shifts to step ST90. In a case where the image to be processed 5 has been read from the noted region P1 of the recording medium P by the optical sensor 22 (Yes in step ST50), the image processing shifts to step ST52.

In step ST52, the receiving unit 200 receives the image to be processed 5 from the optical sensor 22, and then the image processing shifts to step ST54.

In step ST54, the layout analyzing unit 201 divides the image to be processed 5 into the partial regions 510, 512, 513, and 540 (see FIG. 12B) by performing layout analysis on the image to be processed 5 received by the receiving unit 200, and then the image processing shifts to step ST56.

In step ST56, the layout analyzing unit 201 causes the layout information 211 to be stored in the storage device 21, and then the image processing shifts to step ST58.

In step ST58, the character recognizing unit 28D performs character recognizing processing on each of the partial regions 510, 512, 513, and 540, and then the image processing shifts to step ST60.

In step ST60, the character recognizing unit 28D causes the character recognition result information 213 obtained by the character recognizing processing to be stored in the storage device 21, and then the image processing shifts to step ST62.

In step ST62, the character recognizing unit 28D determines whether or not the character recognizing processing has been performed on all of the partial regions 510, 512, 513, and 540. In a case where the character recognizing processing has been performed on not all of the partial regions 510, 512, 513, and 540 (No in step ST62), the image processing shifts to step ST58. In a case where the character recognizing processing has been performed on all of the partial regions 510, 512, 513, and 540 (Yes in ST62), the image processing shifts to step ST64.

In step ST64, the outlier character detection unit 202 calculates a distribution of sizes of characters included in the character recognition result information 213 stored in the storage device 21, and then the image processing shifts to step ST66.

In step ST66, the outlier character detection unit 202 detects an outlier character on the basis of the calculated distribution of the sizes of the characters, and then the image processing shifts to step ST68.

In step ST68, the cutout unit 203 specifies the partial region 540 (see FIG. 12B) including the outlier character detected by the outlier character detection unit 202 by referring to the layout information 211 and the character recognition result information 213 stored in the storage device 21, and then the image processing shifts to step ST70 illustrated in FIG. 15B.

In step ST70 illustrated in FIG. 15B, the cutout unit 203 cuts out the specified partial region 540, and then the image processing shifts to step ST71.

In step ST71, the acquisition unit 28A acquires the partial region 540 cut out by the cutout unit 203, and then the image processing shifts to step ST72.

In step ST72, the modifying unit 28B transmits image generation request information to a generator 70A, and then the image processing shifts to step ST74. The image generation request information includes the partial region 540 acquired by the acquisition unit 28A. The generator 70A acquires the partial region 540 from the image generation request information, generates a solid-line image by turning an intermittent line included in the acquired partial region 540 into a solid line, and transmits the generated solid-line image to the modifying unit 28B as a modified image.

In step ST74, it is determined whether or not the modified image transmitted from the generator 70A has been received. In a case where the modified image transmitted from the generator 70A has not been received (No in step ST74), the determining process in step ST74 is performed again. In a case where the modified image transmitted from the generator 70A has been received (Yes in step ST74), the image processing shifts to step ST76.

In step ST76, the layout analyzing unit 201 further performs layout analysis on the modified image received by the modifying unit 28B, and then the image processing shifts to step ST78.

In step ST78, the character recognizing unit 28D determines whether or not the modified image has been divided by the layout analyzing unit 201. In a case where the modified image has not been divided by the layout analyzing unit 201 (No in step ST78), the image processing shifts to step ST84. In a case where the modified image has been divided by the layout analyzing unit 201 (Yes in step ST78), the image processing shifts to step ST80. The case where the modified image has been divided is, for example, a case where the divided regions 541 and 542 have been obtained as illustrated in FIG. 14.

In step ST80, the character recognizing unit 28D performs character recognizing processing on a divided region, and then the image processing shifts to step ST82.

In step ST82, the character recognizing unit 28D causes character recognition result information 213 to be stored in the storage device 21 in association with the divided region. That is, the character recognizing unit 28D updates the character recognition result information 213 in the storage device 21 by substituting the character recognition result information 213 stored in the storage device 21 with the newly obtained character recognition result information 213, and then the image processing shifts to step ST84.

In step ST84, the character recognizing unit 28D determines whether or not the character recognizing processing has been executed on all of the divided regions. In a case where the character recognizing processing has been executed on not all of the divided regions (No in step ST84), the image processing shifts to step ST80. In a case where the character recognizing processing has been executed on all of the divided regions (Yes in step ST84), the image processing shifts to step ST86.

In step ST86, the cutout unit 203 determines whether or not all partial regions including an outlier character have been cut out. In a case where not all partial regions including an outlier character have been cut out (No in step ST86), the image processing shifts to step ST70. In a case where all partial regions including an outlier character have been cut out (Yes in step ST86), the image processing shifts to step ST88.

In step ST88, the controller 28E acquires the character recognition result information 213 from the storage device 21 and causes a character recognition result indicated by the acquired character recognition result information 213 to be displayed on a display 23, and then the image processing shifts to step ST90.

In step ST90, the controller 28E determines whether or not an image processing end condition has been satisfied. In a case where the image processing end condition has not been satisfied (No in step ST90), the image processing shifts to step ST50. In a case where the image processing end condition has been satisfied (Yes in step ST90), the image processing ends.

Although deep learning using a generative adversarial network has been described as an example of machine learning in each of the above exemplary embodiments, the technique of the present disclosure is not limited to this. For example, another neural network such as a CNN or an FCN may be used instead of the generative adversarial network or together with the generative adversarial network.

Although an example in which the generative adversarial network is constructed by the CPU 48 in the server device 14 has been described in each of the above exemplary embodiments, the technique of the present disclosure is not limited to this. For example, the generative adversarial network may be constructed by plural CPUs. Alternatively, for example, the generative adversarial network may be constructed by a GPU. Alternatively, for example, the generative adversarial network may be constructed by a combination of at least one CPU and at least one GPU.

Figure 16:
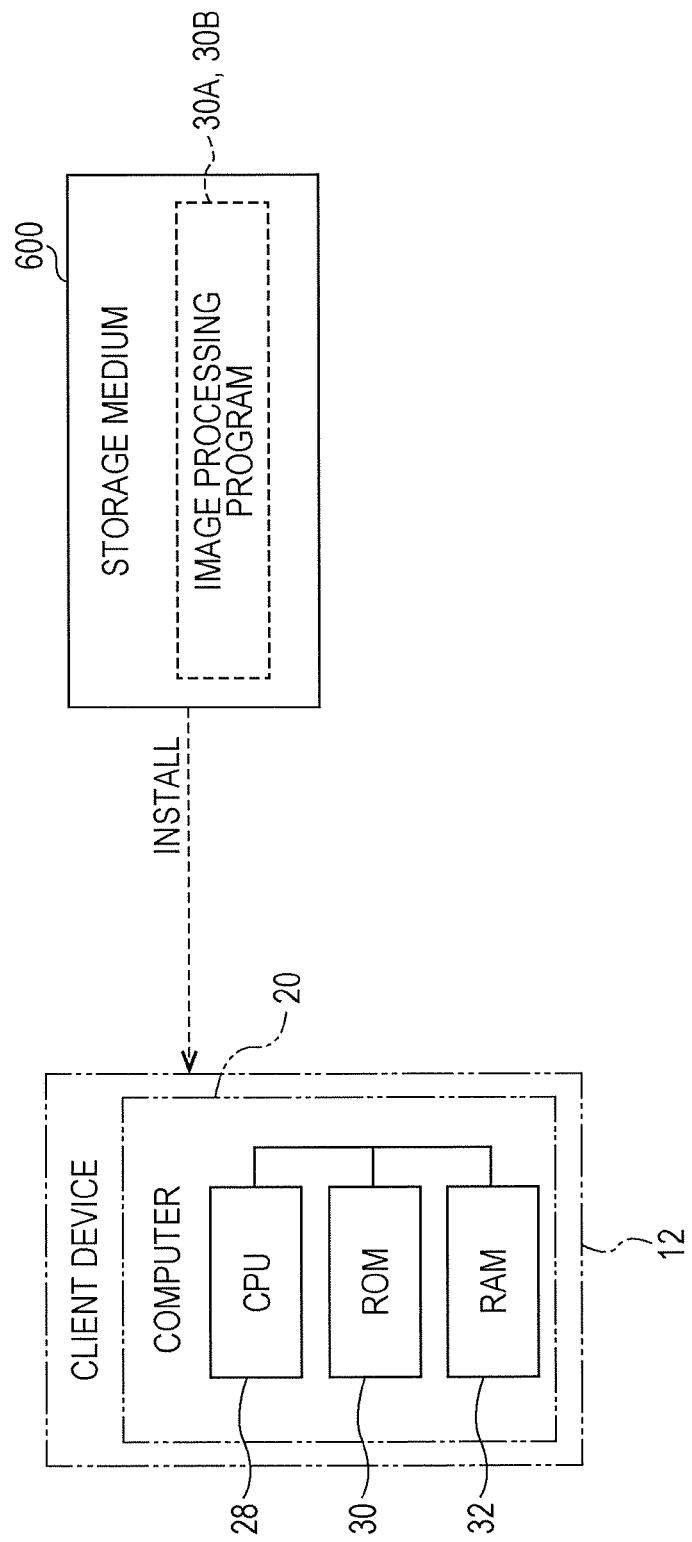
FIG. 16 is a conceptual diagram illustrating an example of an aspect in which an image processing program is installed into a computer in a client device from a storage medium in which the image processing program is stored according to the first and second exemplary embodiments.

Although an example in which the image processing program 30A or 30B (hereinafter referred to as an "image processing program" without a reference sign) is stored in the ROM 30 has been described in each of the above exemplary embodiments, the technique of the present disclosure is not limited to this. For example, as illustrated in FIG. 16, the image processing program may be stored in a storage medium 600. In this case, the image processing program stored in the storage medium 600 is installed in the computer 20, and the CPU 28 executes the image processing in accordance with the image processing program.

Although the CPU 28 is a single CPU in the example illustrated in each of the above exemplary embodiments, the technique of the present disclosure is not limited to this. Plural CPUs may be employed, a GPU may be employed, or a combination of at least one CPU and at least one GPU may be employed. The storage medium 600 is, for example, any portable storage medium such as a CD-ROM, a DVD-ROM, an SSD, or a USB memory.

The image processing program may be stored in a storage unit such as another computer or a server device connected to the computer 20 over a communication network (not illustrated), and the image processing program may be downloaded into the computer 20 in response to a request from the client device 12. In this case, the downloaded image processing program is installed into the computer 20 and is executed by the CPU 28 of the computer 20.

Although an example in which the acquisition unit 28A, the modifying unit 28B, the classifying unit 28C, the character recognizing unit 28D, and the controller 26E (hereinafter referred to as "each unit described in the first exemplary embodiment") is realized by a software configuration using the computer 20 has been described in the first exemplary embodiment, the technique of the present disclosure is not limited to this. Furthermore, although an example in which the acquisition unit 28A, the modifying unit 28B, the character recognizing unit 28D, the controller 26E, the receiving unit 200, the layout analyzing unit 201, the outlier character detection unit 202, and the cutout unit 203 (hereinafter referred to as "each unit described in the second exemplary embodiment") is realized by a software configuration using the computer 20 has been described in the second exemplary embodiment, the technique of the present disclosure is not limited to this. For example, each unit described in the first exemplary embodiment and each unit described in the second exemplary embodiment may be realized, for example, by a device including at least one of an ASIC, an FPGA, and a PLD.

Each unit described in the first exemplary embodiment and each unit described in the second exemplary embodiment may be realized by a combination of a hardware configuration and a software configuration.

Various kinds of processors described below can be used as a hardware resource for executing the image processing. The processor may be, for example, a CPU that is a general-purpose processor that functions as a hardware resource for executing the image processing by executing software, i.e., a program as described above. Furthermore, the processor may be, for example, a dedicated electric circuit that is a processor having a circuit configuration designed exclusively for execution of specific processing such as an FPGA, a PLD, or an ASIC.

A hardware resource for executing the image processing may be constituted by one of these kinds of processors or may be constituted by a combination of two or more processors of the same type or different types (e.g., a combination of FPGAs or a combination of CPU and FPGA). The hardware resource for executing the image processing may be a single processor.

An example of the case where the hardware resource for executing the image processing is constituted by a single processor is a case where a single processor is constituted by a combination of at least one CPU and software as represented by a computer such as a client or a server and this processor functions as a hardware resource that executes processing of each unit described in the first exemplary embodiment and each unit described in the second exemplary embodiment. Another example of the case where the hardware resource for executing the image processing is constituted by a single processor is a case where a processor that realizes a function of an entire system including plural hardware resources for executing the image processing by an IC chip is used as represented by a SoC or the like. The processing of each unit described in the first exemplary embodiment and each unit described in the second exemplary embodiment is realized by using one or more of the various kinds of processors described above as the hardware resource.

More specifically, an electric circuit combining circuit elements such as semiconductor elements may be used as a hardware structure of these various kinds of processors.

The image processing is merely an example. Needless to say, it is also possible to delete an unnecessary step, add a new step, and change a processing order without departing from the spirit.

The above description and illustration are detailed description of a part related to the technique of the present disclosure and merely an example of the technique of the present disclosure. For example, the above description concerning configuration, function, operation, and effect is description concerning an example of configuration, function, operation, and effect of the part related to the technique of the present disclosure. Needless to say, deletion of an unnecessary part, addition of a new element, and substitution in the above description and illustration are possible without departing from the spirit of the technique of the present disclosure. In order to avoid confusion and facilitate understanding of the part related to the technique of the present disclosure, description concerning technical common knowledge and the like that need not be described in particular to enable the technique of the present disclosure is omitted in the above description and illustration.

All documents, patent applications, and technical standards described herein are incorporated herein by reference similarly to a case where there is specific description about incorporation by reference of individual documents, patent applications, and technical standards.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a memory, storing a program; and
a processor, executing the program to be configured to function as
an acquisition unit that acquires an image; and
a modifying unit that modifies the image acquired by the acquisition unit by turning an intermittent line different from a line that constitutes a character into a mark by using machine learning in a stage before the image is classified into the character and a mark by a classifying unit;
wherein in the stage, a divided image on which the character has been falsely recognized by a character recognizing function among a plurality of divided images obtained by dividing a character recognition target image decided as a target of character recognition by the character recognizing function is acquired as the image by the acquisition unit.

2. The image processing apparatus according to claim 1, wherein
the modifying unit turns the intermittent line into a mark by turning the intermittent line into a solid line.

3. The image processing apparatus according to claim 2, wherein
the machine learning is machine learning using an image generation network; and
the modifying unit turns the intermittent line into a solid line by using a generator included in the image generation network.

4. The image processing apparatus according to claim 3, wherein
the modifying unit causes the generator that has learned by competing with a discriminator included in the image generation network to turn the intermittent line into a solid line.

5. The image processing apparatus according to claim 4, wherein
the modifying unit modifies the image by causing the generator to generate a solid-line image on which the intermittent line has been turned into a solid line from the image acquired by the acquisition unit.

6. The image processing apparatus according to claim 3, wherein
the modifying unit acquires a learning result obtained by the generator that has learned by competing with a discriminator included in the image generation network and turns the intermittent line into a solid line by using the acquired learning result.

7. The image processing apparatus according to claim 6, wherein
the modifying unit modifies the image by generating a solid-line image on which the intermittent line has been turned into a solid line from the image acquired by the acquisition unit by using the learning result.

8. An image processing apparatus comprising:
a memory, storing a program; and
a processor, executing the program to be configured to function as
an acquisition unit that acquires an image; and
a modifying unit that modifies the image acquired by the acquisition unit by removing an intermittent line different from a line that constitutes a character by using machine learning in a stage before the image is classified into the character and a mark by a classifying unit wherein in the stage, a divided image on which the character has been falsely recognized by a character recognizing function among a plurality of divided images obtained by dividing a character recognition target image decided as a target of character recognition by the character recognizing function is acquired as the image by the acquisition unit.

9. The image processing apparatus according to claim 8, wherein the machine learning is machine learning using an image generation network; and the modifying unit removes the intermittent line by using a generator included in the image generation network.

10. The image processing apparatus according to claim 9, wherein the modifying unit causes the generator that has learned by competing with a discriminator included in the image generation network to remove the intermittent line.

11. The image processing apparatus according to claim 10, wherein the modifying unit modifies the image by causing the generator to generate, from the image acquired by the acquisition unit, an intermittent-line-removed image on which the intermittent line has been removed.

12. The image processing apparatus according to claim 9, wherein the modifying unit acquires a learning result obtained by the generator that has learned by competing with a discriminator included in the image generation network and removes the intermittent line by using the acquired learning result.

13. The image processing apparatus according to claim 12, wherein the modifying unit modifies the image by generating, from the image acquired by the acquisition unit, an intermittent-line-removed image on which the intermittent line has been removed by using the learning result.

14. The image processing apparatus according to claim 1, wherein the processor is further comprising configured to function as an extracting unit that extracts a character region including the character from a modified image obtained by modifying the image by the modifying unit.

15. The image processing apparatus according to claim 8, wherein the processor is further configured to function as an extracting unit that extracts a character region including the character from a modified image obtained by modifying the image by the modifying unit.

16. The image processing apparatus according to claim 14, wherein the processor is further configured to function as a character recognizing unit that performs character recognition on the character region extracted by the extracting unit.

17. The image processing apparatus according to claim 16, wherein the processor is further configured to function as a controller that causes a character recognition result of the character recognizing unit to be displayed on a display.

18. A non-transitory computer readable medium storing a program causing a computer to execute a process for image processing, the process comprising:

acquiring an image; and modifying the acquired image by turning an intermittent line different from a line that constitutes a character into a mark by using machine learning in a stage before the image is classified into the character and a mark;

wherein in the stage, a divided image on which the character has been falsely recognized by a character recognizing function among a plurality of divided images obtained by dividing a character recognition target image decided as a target of character recognition by the character recognizing function is acquired as the image by acquiring the image.

* * * * *